United States Patent

Watanabe et al.

[11] Patent Number: 6,011,759
[45] Date of Patent: Jan. 4, 2000

[54] SYSTEM FOR SUPPLYING INFORMATION TO TERMINAL DEVICE

[75] Inventors: Osamu Watanabe; Yoshihiro Nishida; Masatsugu Yamamoto; Fumiko Oguni; Mitsuaki Maeno, all of Tokyo, Japan

[73] Assignee: Mitsubishi Denki Kabushiki Kaisha, Tokyo, Japan

[21] Appl. No.: 09/300,511

[22] Filed: Apr. 28, 1999

[30] Foreign Application Priority Data

Apr. 28, 1998 [JP] Japan .................................. 10-118957
Oct. 1, 1998 [JP] Japan .................................. 10-279709

[51] Int. Cl.⁷ .................................................. G11B 17/22
[52] U.S. Cl. .................................. 369/30; 369/33; 369/36
[58] Field of Search .................................. 369/30, 29, 34, 369/36, 33, 38, 37, 75.2, 77.1, 77.2, 192, 13, 191; 360/98.06

[56] References Cited

U.S. PATENT DOCUMENTS 5,560,040  9/1996  Mizumachi .................................. 710/1
5,768,222  6/1998  Hisamatsu et al. ........................ 369/30

FOREIGN PATENT DOCUMENTS 3-94342    4/1991  Japan .
8-98122    4/1996  Japan .
9-82072    3/1997  Japan .
2652595    5/1997  Japan .

*Primary Examiner*—Ali Neyzari

[57] ABSTRACT

The system for supplying information to a terminal device or devices has one or more optical disk drives, a magnetic disk storage for storing information regarding a beginning portion of the information recorded on the optical disk or disks, one or more optical disk monitoring circuits, an electronic switch assembly for selectively outputting one of the stored information from the magnetic disk storage and the readout information from the optical disk drive, one or more FIFO memories for temporarily holding and outputting information from the electronic switch assembly, and a controller which causes the electronic switch assembly to output the stored information from the magnetic disk storage in response to the playback request input, and subsequently causes the electronic switch assembly to output the readout information from the optical disk drive in response to the signal from the optical disk monitoring circuit so that the FIFO memory outputs continuous information.

9 Claims, 14 Drawing Sheets

SYSTEM FOR SUPPLYING INFORMATION TO TERMINAL DEVICE

FIELD OF THE INVENTION

The present invention relates to a system for supplying information such as audio-visual information recorded on a record medium (e.g., an optical disk, a magneto-optical disk, etc.) to a terminal device or devices, and more particularly, to a system which contains a large number of record media and supplies information to the terminal device with a rapid response to a playback request from the terminal device.

FIG. 11 is a block diagram of the arrangement of a prior art system for supplying information as disclosed in Japanese Patent Publication No. 2,652,595, for example. The system 20 is connected to a plurality of terminal devices 1, each of which delivers a playback request signal to the system 20 and which receives and decodes audio-visual information supplied from the system 20. The system 20 includes a controller 2 which controls the entire system responsive to the playback request signal from the terminal device 1, a switching timer 3 which is triggered by the controller 2 to start counting in order to measure a given period of time, a magnetic disk storage 4 which is also triggered by the controller 2 to start a readout operation to read audio-visual information stored therein, a multi-disk unit 5 which has a plurality of optical disk drives 6 for playing back the optical disk 16a and automatic disk changing mechanism 15 for performing a conveying (or changing) operation for an optical disk 16a, an electronic switch assembly 7 which selects audio-visual information read from the magnetic disk storage 4 or audio-visual information read from the optical disk drive 6 and outputs the selected information, a plurality of FIFO (First-In First-Out) memories 8, each of which temporarily stores the audio-visual information delivered from the electronic switch assembly 7, and a conveyance timer 11 which is also triggered by the controller 2 to start counting in order to measure a given period of time.

The operation of the system 20 will now be described. Each of the plurality of terminal devices 1 delivers to the controller 2 a signal which requests audio-visual information from a video library which is stored in the optical disks 16a contained in the multi-disk unit 5. In response to the playback request signal, the controller 2 commands a readout operation to the magnetic disk storage 4 to read one of items of the audio-visual information and controls the electronic switch assembly 7 so as to deliver the audio-visual information read from the magnetic disk storage 4 to one of the FIFO memories 8 which corresponds to the requesting terminal device 1. At the same time, the controller 2 triggers both the switching timer 3 and the conveyance timer 11 so that the optical disk carrying the requested audio-visual information can be mounted or loaded on a particular one of the optical disk drives 6 in the multi-disk unit 5, which is determined in accordance with a given rule, thus preparing for a readout operation from the particular one of the optical disk drives 6.

Suppose that the multi-disk unit 5 requires a maximum preparation time of $t_1$ equal to thirty sec to prepare it for a readout operation. The magnetic disk storage 4 is then previously stored with audio-visual information which corresponds to the maximum preparation time $t_1$. Such audio-visual information is read out in unit of 64 Kbytes, for example, and then delivered through the electronic switch assembly 7 to the given one of the FIFO memories 8 under the control of the controller 2. At this time, the controller 2 controls the readout operation from the magnetic disk storage 4 in a manner to avoid an overflow of audio-visual information from the selected FIFO memory 8.

The maximum preparation time $t_1$ (equal to thirty sec) of the multi-disk unit 5 for its readout operation is determined by the sum of a maximum conveyance time $t_3$ of the automatic disk changing mechanism 15, a maximum rotational preparation time for the optical disk drive 6, a maximum seek time for the optical disk drive 6, a maximum rotational latency for the optical disk drive 6, and a maximum time required to determine readout parameters for the optical disk drive 6. The maximum conveyance time $t_3$ of the multi-disk unit 5 is equal to seven sec, for example.

Concurrently with the above-described operation, the automatic disk changing mechanism 15 of the multi-disk unit 5 executes a mounting or loading of the optical disk 16a carrying the requested audio-visual information on the particular optical disk drive 6, which is completed within the time $t_1$ equal to thirty sec. The conveying operation will have been completed within the time $t_3$ equal to seven sec. The conveyance timer 11 returns an output to the controller 2 seven sec after it has been triggered by the controller 2. The switching timer 3 returns an output to the controller 2 after the time $t_1$ equal to thirty sec has passed from the time when it was triggered. The controller 2 detects the output from the switching timer 3 to control the electronic switch assembly 7 so that it switches from the audio-visual information delivered from the magnetic disk storage 4 to the audio-visual information read by and delivered from the optical disk drive 6, to feed the associated FIFO memory 8, and hence the requesting terminal device 1 to be displayed therein. The above is the operation of the system 20 in response to the playback request from one of the terminal devices 1.

An operation of the system 20 when a plurality of terminal devices 1 issue playback requests will now be described. In the multi-disk unit 5 having the number n optical disk drives 6, where n is the number of the drives 6, there is generally provided with automatic disk changing mechanism 15 having m conveyers, where m is less than n. When m is equal to 1, for example, the single conveyer must sequentially operate to convey each requested optical disk 16a form the rack 16 to the respective associated optical disk drive 6. The multi-disk unit 5 then operates in a manner such that each time the maximum conveyance time $t_3$ passes for the playback request from each terminal device 1, it then issues a readout command associated with the audio-visual information for the next following playback request, thus initiating another disk conveying operation. On the other hand, the response to the plurality of playback requests takes place in the magnetic disk storage 4 by reading out audio-visual information to selected FIFO memories 8 and corresponding terminal devices 1 in a time sharing scheme. However, the conveying operation of the optical disk 16 is actually completed earlier than the termination of the maximum conveyance time $t_3$.

The magnetic disk storage 4 is subject to an upper limit of data output rate, which may be 20 Mbits/sec, for example, and cannot output data at a higher rate. Accordingly, assuming for purpose of an example that each audio-visual information is encoded at a rate of 6 Mbits/sec, it follows that the number of items of audio-visual information which can be simultaneously played back by or delivered from the single magnetic disk unit 4 will be calculated using the following expression:

$$20 \text{ Mbits/sec} \div 6 \text{ Mbits/sec} = 3.333$$

to be limited to three. This means that if four playback requests occur simultaneously within the maximum preparation time $t_1$ of the multi-disk unit 5, there arises a waiting time of up to thirty sec at maximum for the fourth playback request.

FIG. 12 illustrates the case when four playback requests $R_A$, $R_B$, $R_C$ and $R_D$, for example, occur within a time period from the beginning of the first playback request $R_A$ to the termination of the maximum preparation time $t_1$ (equal to thirty sec) of the multi-disk unit 5. There is a waiting time $t_2$ until the conveying operation responsive to the playback request $R_D$ can be initiated, as represented by a period of time from the termination of the maximum conveyance time $t_3$ for the playback request $R_C$ to the termination of the maximum preparation time $t_1$ for the playback request $R_A$. The length of the waiting time $t_2$ is calculated as follows:

$$t_2 = t_1 - (3 \times t_3) = 30 - (3 \times 7) = 9 \text{ sec}$$

Thus when a number of playback requests are issued from the terminal devices 1 which exceeds the number of such requests which can be responded by the magnetic disk storage 4 (storage means) within the maximum preparation time $t_1$ of the optical disk drive 6 (playback means), the response to that playback request $R_D$ which exceeded the response capability cannot be initiated until the maximum preparation time $t_1$ for the initial playback request $R_A$ expires, even though the operation may be switched into the readout operation from the optical disk drive 6 for the initial playback request $R_A$.

Further, in the event the following playback request issues before the termination of the maximum conveyance time $t_3$ of the preceding playback request, a playback operation from the magnetic disk storage 4 in response to the following playback request is inhibited until the maximum conveyance time passes even if the conveying operation of the optical disk associated with the first playback request were actually completed.

SUMMARY OF THE INVENTION

It is an object of the present invention to provide a system for supplying information to a terminal device capable of rapidly responding to one or more playback requests independently from the timing when these playback requests occur.

According to the present invention, a system for supplying information to a terminal device comprises: playback means for mounting a record medium and reading information recorded on the record medium to output a first information storage means for storing information regarding a beginning portion of the information recorded on the record medium, a length of the beginning portion being equal to or longer than a length corresponding to a first preparation time which is defined as a time from a playback request input to completion of readout preparation of the playback means, the storage means being capable of beginning to output a second information corresponding to the stored information with a second preparation time shorter than the first preparation time; monitoring means for monitoring status of the playback means and outputting a signal indicating the status; switching means for selectively outputting one of the second information from the storage means and the first information from the playback means; buffer means for temporarily holding and outputting information from the switching means; and control means for performing a control operation wherein the second information is first output from said storage means through the switching means in response to the playback request input from the terminal device, and subsequently the first information is output from the playback means through the switching means in response to the signal from the monitoring means so that the buffer means outputs continuous information which includes the second information and the first information following the second information to the terminal device.

The system may further comprises: a rack being capable of accommodating a plurality of record media; and medium changing means for conveying any of the plurality of record media in the rack to the playback means in response to the playback request from the terminal device.

Further, the playback means may include a magneto-optical disk drive which mounts a record medium and optically read information recorded on the record medium to output the first information.

Furthermore, the storage means may include a magnetic disk storage which magnetically records information on a magnetic disk and reads the recorded information to output the second information.

Moreover, the storage means may includes a magneto-optical disk drive which mounts a magneto-optical disk, which stores information regarding a beginning portion of the information recorded on the record medium, and optically records information on the magneto-optical disk and reads the recorded information to output the second information.

Further, the monitoring means may output the signal indicating the status when the readout preparation of the playback means for the record medium designated by the terminal device has been completed.

Furthermore, the monitoring means may output the signal indicating the status when the record medium designated by the terminal device has been conveyed to the playback means.

Moreover, when a plurality of playback requests are input to the control means from a plurality of terminal device, the control means first begins the control operation for a record medium to be reproduced early; and when the readout preparation of the playback means for the record medium to be reproduced early is completed, the control means begins the control operation for a record medium to be reproduced next.

Further, when a plurality of playback requests are input to the control means from a plurality of terminal device, the control means first begins the control operation for a record medium to be reproduced early; and when the record medium to be reproduced early has been conveyed to the playback means by the medium changing means, the control means begins the control operation for a record medium to be reproduced next.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Figure 11:
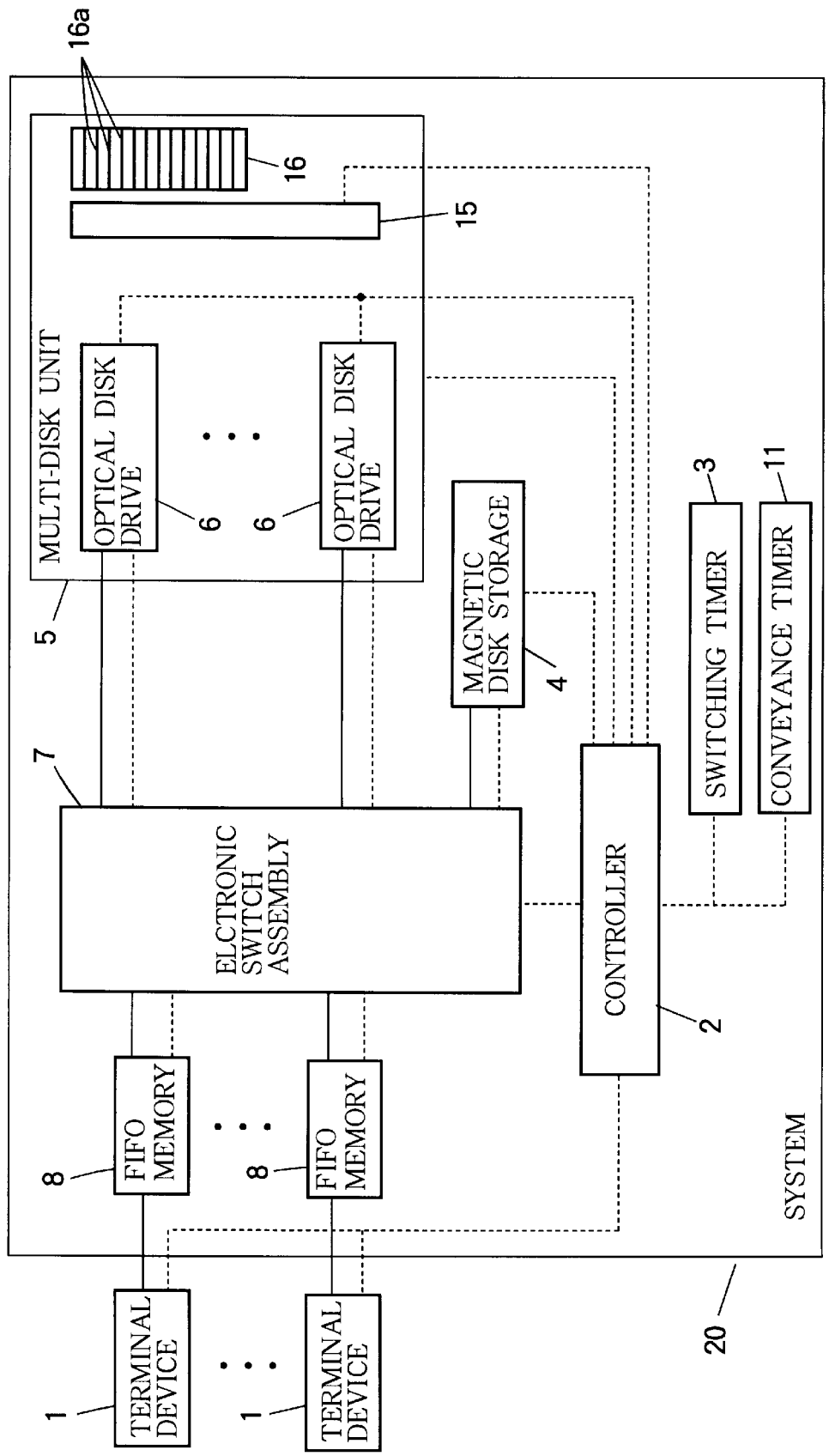
FIG. 11 is a block diagram showing the arrangement of a prior art system for supplying information to a terminal device.
Figure 12:
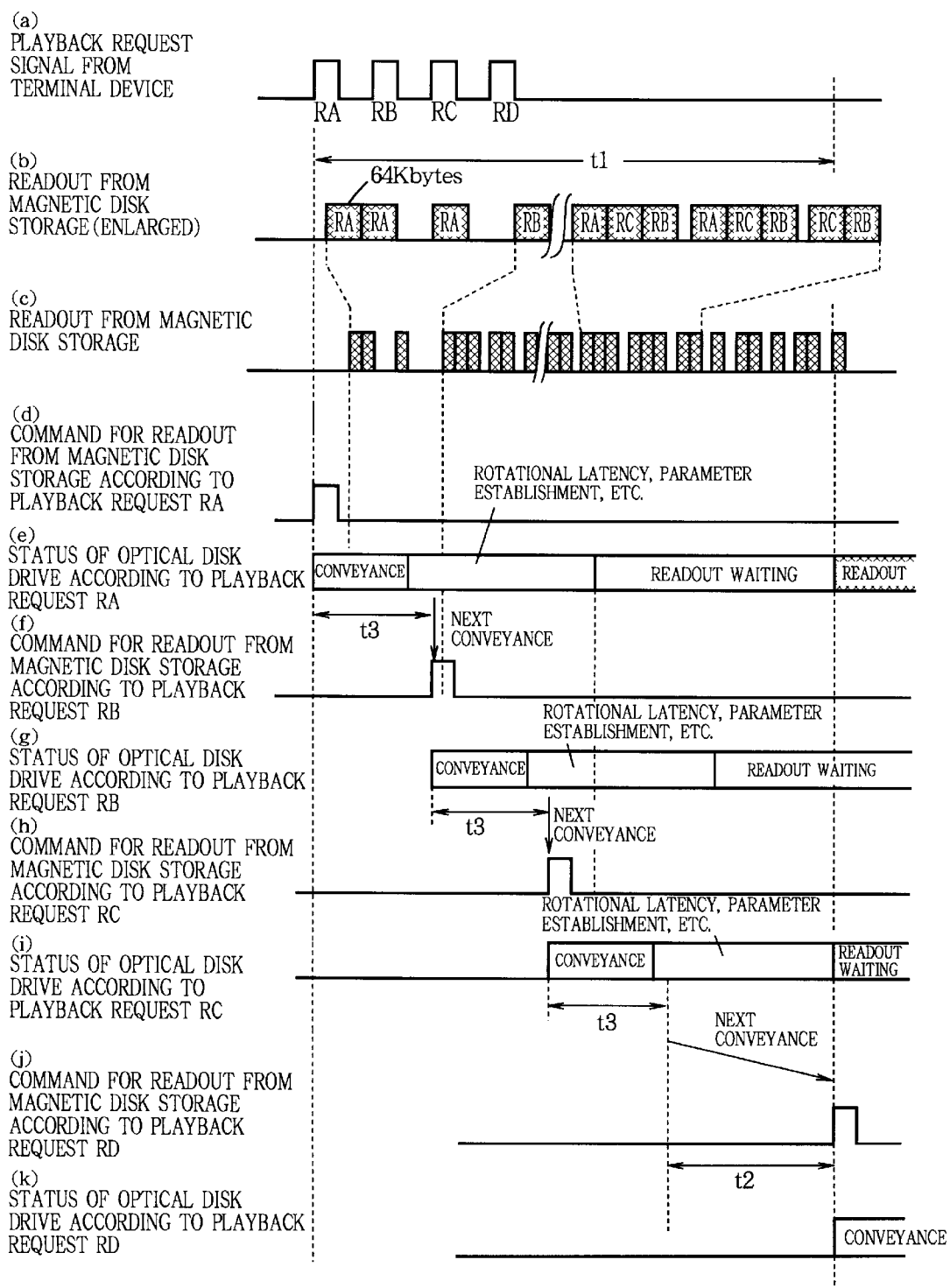
FIG. 12 illustrates the response operation of the system of FIG. 11 when a plurality of playback requests are issued.

A system for supplying information to terminal devices according to the present invention will be specifically described with respect to five embodiments shown in the drawings, wherein similar parts are designated by like numerals or characters as used for the prior art arrangement shown in FIG. 11.

First Embodiment

Figure 1:
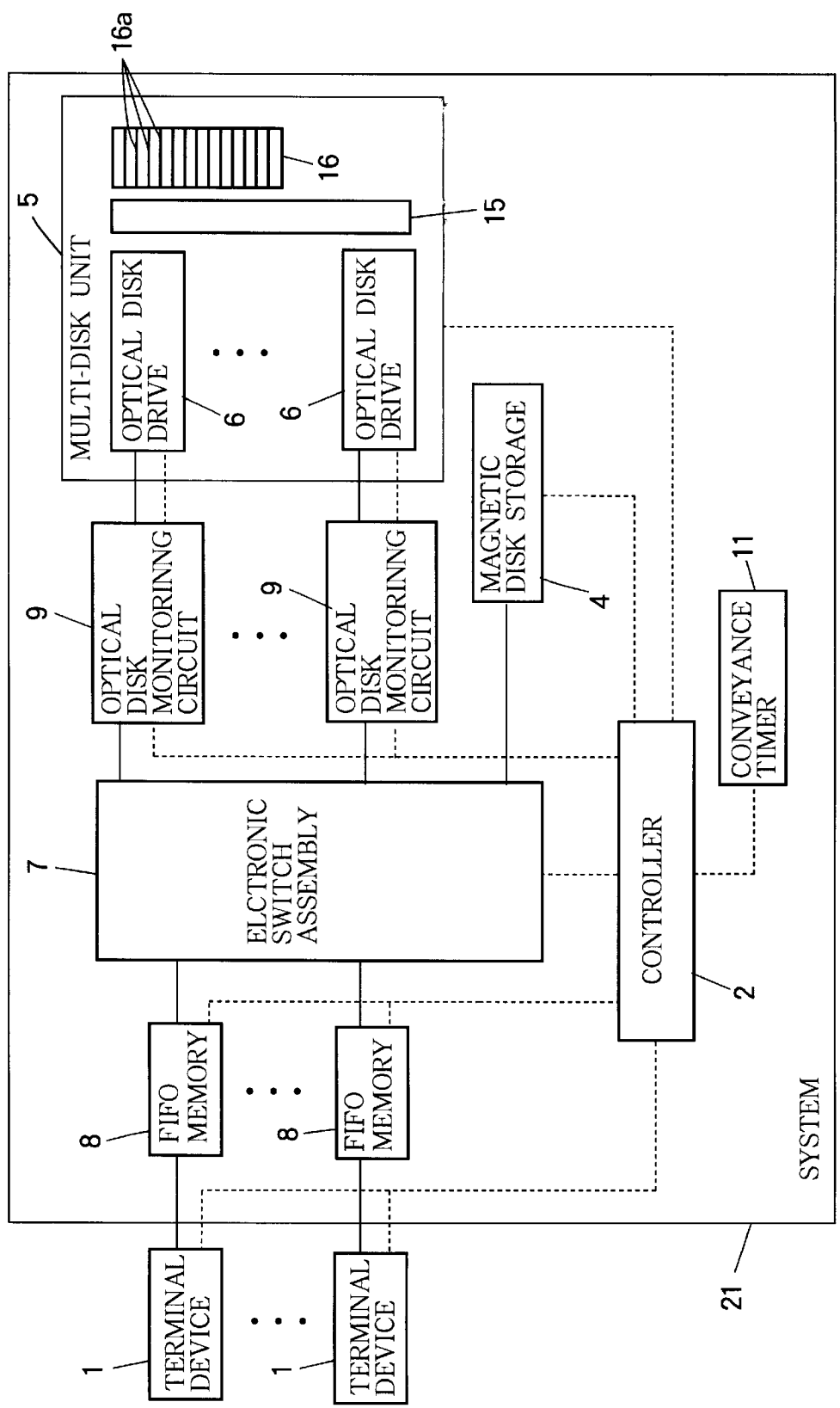
FIG. 1 is a block diagram showing the arrangement of a system for supplying information to terminal devices according to a first embodiment of the present invention.

FIG. 1 is a block diagram showing the arrangement of a system for supplying information to terminal devices according to a first embodiment of the present invention.

Referring to FIG. 1, the system 21 for supplying information to terminal devices 1 has a multi-disk unit 5 which includes one or more optical disk drives 6 such as a magneto-optical disk drive and the like, a rack 16 being capable of accommodating a plurality of optical disks 16a such as magneto-optical disks (MO) and the like, and automatic disk changing mechanism 15 for conveying a disk 16a between the rack 16 and the optical disk drives 6. The each optical disk drive 6 is capable of mounting an optical disk 16a and playing back an information item such as a music number or a video program recorded on the mounted optical disk 16a to output reproduced information such as audio-visual information.

The system 21 also has a magnetic disk storage (i.e., a hard disk drive) 4 for storing information regarding a beginning portion of the each information item recorded on the disk or disks 16a to be reproduced. The beginning portion of the each information item of the optical disks 16a are stored, for example, immediately after the optical disk 16a is inserted into the rack 16 or a power switch (not shown) of the system 21 is turned on. A length of the beginning portion is set to be equal to or longer than a length corresponding to a readout preparation time which is defined as a time from a playback request input to completion of readout preparation of the optical disk drive 6 which mounts the optical disk 16a to be reproduced. The magnetic disk storage 4 is capable of beginning to output the stored information with a readout preparation time shorter than the readout preparation time of the optical disk drive 6.

The system 21 further has optical disk monitoring circuits 9 each monitoring status of the optical disk drive 6 and outputting a signal indicating the status of the optical disk drive 6, an electronic switch assembly 7 for selectively outputting one of the stored information from the magnetic disk storage 4 and the reproduced information from the optical disk drives 6, and FIFO memories 8 for temporarily holding and outputting information from the electronic switch assembly 7.

The system 21 has a controller 2 which performs a control operation for causing the electronic switch assembly 7 to output the stored information from the magnetic disk storage 4 in response to the playback request input from the terminal device 1, and subsequently causing the electronic switch assembly 7 to output the reproduced information from the optical disk drive 6 in response to the signal from the optical disk monitoring circuit 9 so that the FIFO memory 9 outputs to the terminal device 1 continuous information which includes the stored information from the magnetic disk storage 4 and the reproduced information from the optical disk drive 6 following the stored information from the magnetic disk storage 4. Further, a reference numeral 11 denotes a conveyance timer which is triggered by the controller 2 to start counting in order to measure a given period of time.

As described above, the system 21 shown in FIG. 1 is distinguished from the prior art arrangement shown in FIG. 11 by the provision of the optical disk monitoring circuits 9, each of which reads out audio-visual information from a disk 16a mounted on the optical disk drive 6 while monitoring the status of the optical disk drive 6 under the control of a controller 2. The optical disk monitoring circuits 9 and the optical disk drives 6 are interconnected by a SCSI (Small Computer System Interface), for example.

The operation of the system 21 of the first embodiment will now be described with reference to FIG. 2 which shows the response operation of the system 21.

A magnetic disk storage 4 is previously stored with audio-visual information which are recorded in the beginning portion of the respective information items recorded on the optical disks 16a for a predetermined time $t_1$ equal to thirty sec (which represents a maximum preparation time required for a readout operation by the optical disk drive 6 of the multi-disk unit 5). When a playback request signal, which requires that an item of audio-visual information be played back, is delivered from terminal devices 1 to the controller 2 ((a) in FIG. 2), the controller 2 responds thereto by commanding a magnetic disk storage 4 to read out the beginning portion of the audio-visual information item ((c) in FIG. 2), and controls an electronic switch assembly 7 to deliver the audio-visual information read from the magnetic disk storage 4 to the FIFO memory 8 which corresponds to the requesting terminal device 1. The controller 2 also controls the multi-disk unit 5 so that a particular optical disk carrying the requested audio-visual information be mounted on a particular one of optical disk drives 6 contained therein which is determined in accordance with a given rule ((b) in FIG. 2) while starting a conveyance timer 11 to count in order to measure a maximum conveyance time $t_3$ which is preset for the multi-disk unit 5.

The beginning portion of the audio-visual information item, which is read from the magnetic disk storage 4 in this manner, is delivered to a corresponding one of the FIFO memories 8 through the electronic switch assembly 7. At this time, the controller 2 controls the readout operation from the magnetic disk storage 4 in a manner to avoid an overflow or an underflow of information in the FIFO memory 8.

Concurrently with the above control operations, the automatic disk changing mechanism 15 of the multi-disk unit 5 executes a mounting or loading of the optical disk 16a having the requested audio-visual information (including a requested title) on the particular one of the optical disk drives 6. The conveyance timer 11 returns an output to the controller 2 after the maximum conveyance time $t_3$ as counted from the time when it was triggered to start counting by the controller 2. In the present example, the maximum conveyance time $t_3$ is chosen to be seven sec, for example.

Figure 2:
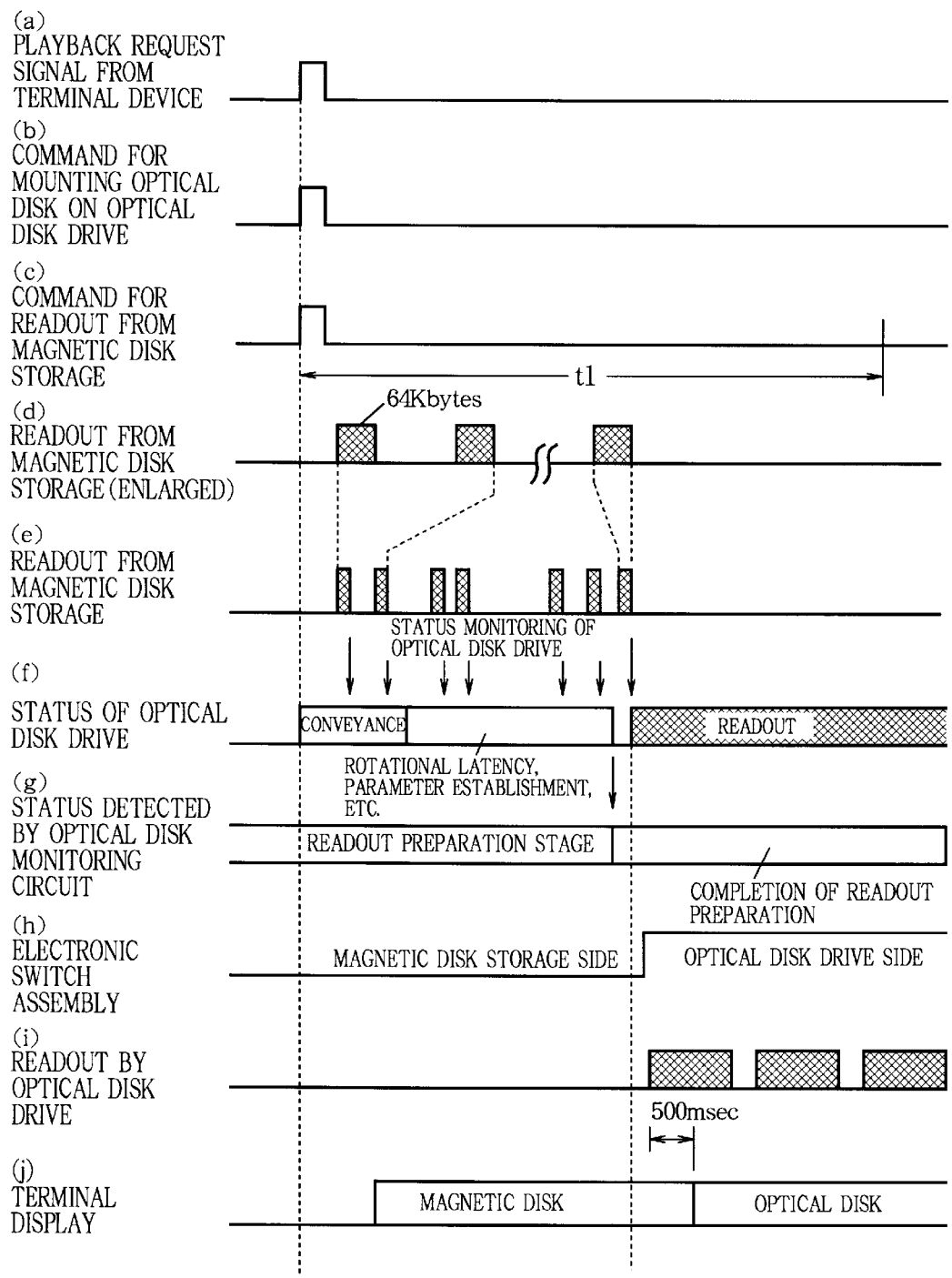
FIG. 2 illustrates the response operation of the system of the first embodiment when a single playback request is issued.

The optical disk monitoring circuit 9 monitors a status of the associated optical disk drive 6 and output to the controller 2 a signal indicating the status of the associated optical disk drive 6 ((g) in FIG. 2). As shown at (g) in FIG. 2, at first, the status detected by the optical disk monitoring circuit 9 is a readout preparation stage of the associated optical disk drive 6. Subsequently, the status detected by the optical disk monitoring circuit 9 is changed to the completion of a readout preparation of the associated optical disk drive 6.

A readout of audio-visual information from the magnetic disk storage 4 is performed in unit of 64 Kbytes, for example, by causing the controller 2 to control the electronic switch assembly 2, to be delivered to the given FIFO memory 8 ((d) in FIG. 2). Each time the readout of 64 Kbytes unit of audio-visual information is completed, the controller 2 interrogates the optical disk monitoring circuit 9 about the status of the optical disk drive 6. If a result of the interrogation indicates that the readout preparation for the optical disk drive 6 is not yet completed, the readout operation from the magnetic disk storage 4 is continued. However, if the readout preparation for the optical disk drive 6 is completed, a readout of the next 64 Kbytes unit of audio-visual information is not performed from the magnetic disk storage 4, but is switched into the readout of the audio-visual information from the optical disk drive 6 by controlling the electronic switch assembly 7 ((e), (f) and (h) in FIG. 2).

At this time, a position on the optical disk from which the readout is begun is a position where data immediately following data read from the magnetic disk storage 4 is recorded. Such position can be calculated on the basis of the number of times 64 Kbytes data is read out, within a period of time of 10 msec, for example. Therefore, the readout of the audio-visual information can be initiated after 50 msec, for example, after the optical disk drive 6 is accessed ((e) and (i) in FIG. 2).

Since there is an empty time of 60 msec in the data transfer from the optical disk, the FIFO memory 8 is provided with a capacity of 256 Kbytes, for example, and a control is exercised so that audio-visual information equal to or in excess of one-half the capacity (i.e., 128 Kbytes) is always stored therein. When the data is encoded at a rate of 6 Mbits/sec, 45 Kbytes data will be read out from the FIFO memory 8 during the empty time until the data transfer is initiated, as indicated by a calculation shown below, but because there remains data of 83 Kbytes or more in the FIFO memory 8, there is no problem that the data is interrupted.

$$6000 \text{ Kbits} \times 0.06 \text{ sec} \div 8 \text{ bits} = 45 \text{ Kbytes}$$

The audio-visual information is delivered from the FIFO memory 8 to the terminal device 1 which issued the playback request, and is decoded and displayed within a period of time on the order of 500 msec ((j) in FIG. 2).

The above is the response operation of the system 21 in response to a single playback request from a single terminal device 1.

A response operation of the system 21 which occurs when a plurality of terminal devices 1 issue playback requests will be described with reference to FIG. 3 which illustrates the response operation in a plurality of playback operations in the first embodiment. In the multi-disk unit 5 with the automatic disk changing mechanism 15, optical disks 16a required for the respective optical disk drives 6 are sequentially conveyed in the similar manner as in the prior art system of FIG. 11. However, in the multi-disk unit 5, each time the maximum conveyance time $t_3$ has passed for each of the playback requests $R_A$, $R_B$, $R_C$ and $R_D$, a readout command for the next playback request is issued, initiating the next conveying operation. The magnetic disk storage 4 reads out audio-visual information in a time sharing scheme ((c) in FIG. 3), thus performing a response operation for each corresponding terminal device 1.

The following description relates to a case where it is assumed that the next playback request (for example, $R_B$) occurs before the maximum conveyance time $t_3$ for the optical disk drive 6 which is associated with a preceding playback request (for example, $R_A$) has passed. When the maximum conveyance time $t_3$ is chosen to be equal to seven sec as mentioned above, it is fully possible that the actual conveying operation for the optical disk is completed earlier than the termination of the maximum conveyance time $t_3$ and that a plurality of playback requests may issue in the meantime.

Figure 3:
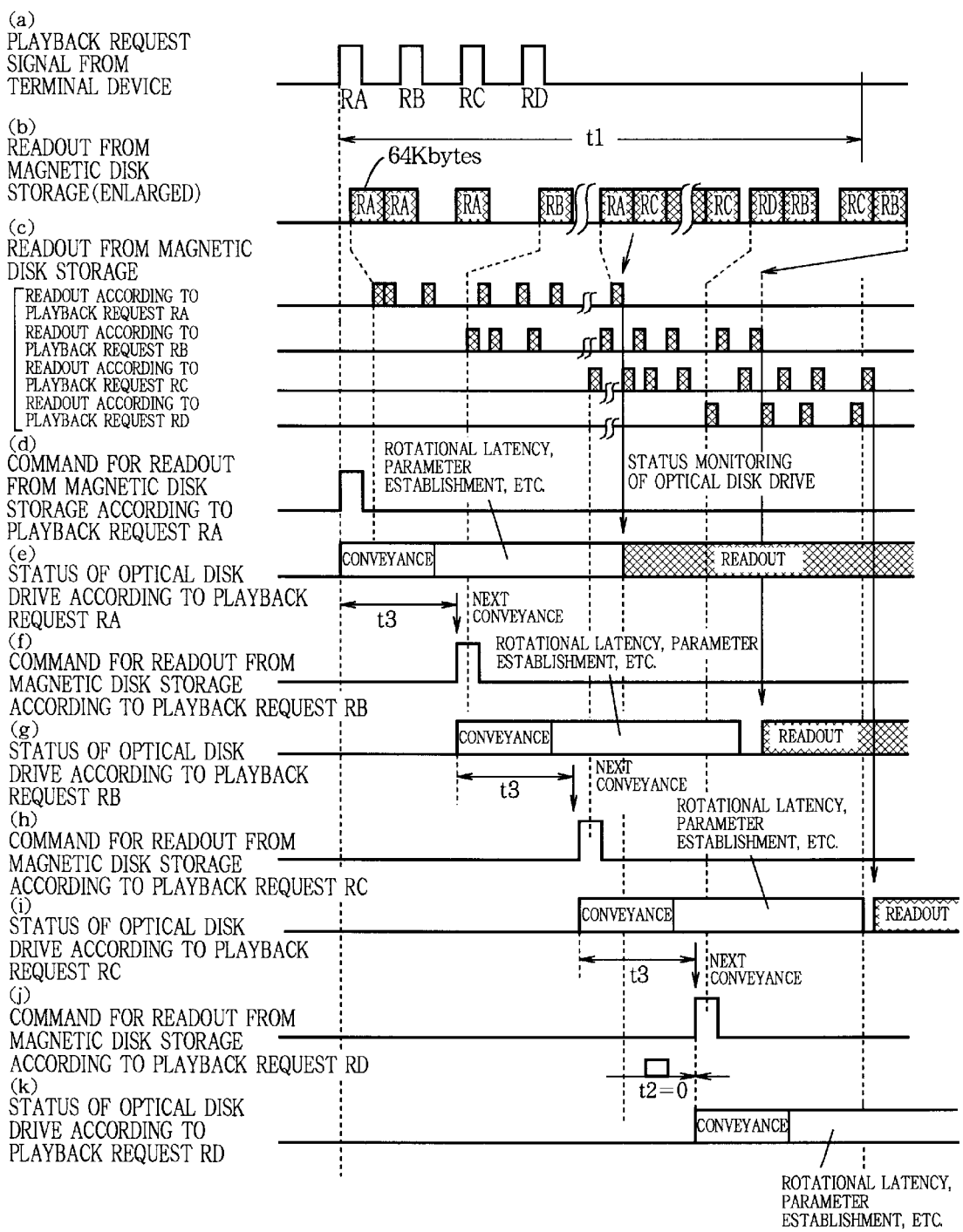
FIG. 3 illustrates the response operation of the system of the first embodiment when a plurality of playback requests are issued.

It is assumed that four playback requests are input to the controller 2 in the sequence of $R_A$, $R_B$, $R_C$ and $R_D$ from the terminal devices 1, As shown at (a) in FIG. 3. The controller 2 commands the magnetic disk storage 4 to read out audio-visual information in response to the initial playback request $R_A$, and also commands the multi-disk unit 5 with the automatic disk changing mechanism 15 to convey the requested optical disk from the rack 16 to the associated optical disk drive 6 ((b)–(d) in FIG. 3).

However, there is an upper limit in the data output rate for the magnetic disk storage 4, which may be on the order of 20 Mbits/sec, and the magnetic disk storage 4 cannot deliver data at a higher rate. Thus, if each audio-visual information is converted into a picture signal at an encoding rate of 6 Mbits/sec, for example, the number of items of audio-visual information which can be simultaneously delivered from the magnetic disk storage 4 will be calculated using the following expression:

$$20 \text{ Mbits/sec} \div 6 \text{ Mbits/sec} = 3.333$$

to be limited to three.

As mentioned previously, the automatic disk changing mechanism 15 of the multi-disk unit 5 operates to convey requested optical disks 16a to respective associated optical disk drives 6 in a sequential manner. Specifically, when the conveying operation for the playback request $R_A$ is completed and the maximum conveyance time $t_3$ passes ((e) in FIG. 3), the controller 2 commands the magnetic disk storage 4 to read out audio-visual information associated with the playback request $R_B$ and also commands a conveyance of the corresponding optical disk for the playback request $R_B$ ((c) and (f) in FIG. 3). Upon completion of the conveying operation for the playback request $R_B$ and upon elapsing the maximum conveyance time $t_3$ ((g) in FIG. 3), the controller 2 commands the magnetic disk storage 4 to read out audio-visual information corresponding to the playback request $R_C$ and also commands a conveyance of the corresponding optical disk for the playback request $R_C$ ((c) and (h) in FIG. 3).

Because of the upper limit in the data output rate from the magnetic disk storage 4, during the time a readout from the magnetic disk storage 4 takes place for the three playback request $R_A$, $R_B$ and $R_C$, a readout of audio-visual information corresponding to the fourth playback request $R_D$, which exceeds the response capability from the magnetic disk storage 4, is inhibited.

When the maximum conveyance time $t_3$ for the playback request $R_C$ has passed, the controller 2 examines whether or not a readout of the audio-visual information corresponding to the playback request $R_A$ from the magnetic disk storage 4 has been completed and the readout preparation for the corresponding optical disk drive 6 is completed. If the readout preparation has been completed, the audio-visual information corresponding to the playback request $R_D$ is read out from the magnetic disk storage 4, and at the same time, a conveyance of the corresponding optical disk is commanded ((b) and (j) in FIG. 3).

Figure 4:
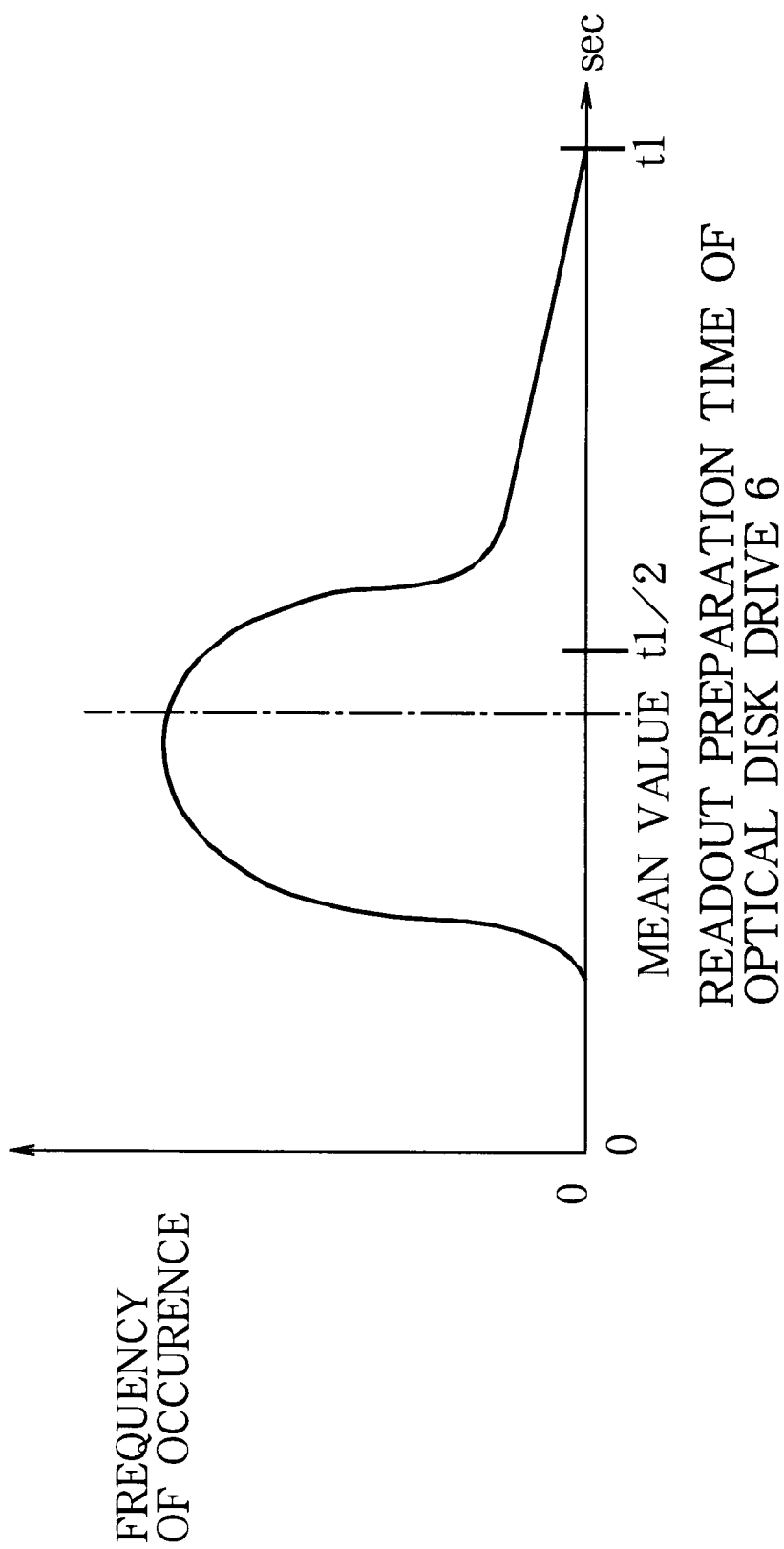
FIG. 4 graphically shows a distribution of the frequency of occurrence of readout preparation times in an optical disk drive in a multi-disk unit of the first embodiment.

FIG. 4 graphically shows a distribution of the readout preparation time of the optical disk drives in the multi-disk unit 5. A maximum preparation time $t_1$ for a readout operation is determined by the sum of an optical disk conveying time which is defined as a time for conveying the optical disk from the rack 16 to the optical disk drive 6, a rotational preparation time for the optical disk drive 6, a seek time, a rotational latency and a time required to determine readout parameters. The time required to determine the readout parameters exhibits an increased variation as compared with other periods of time such as conveying time, rotational preparation time, seek time or rotational latency because a readout operation is attempted while changing various parameters such as readout laser radiation intensity, an angle of irradiation or the like. Thus, a time required to read out an optical disk may be increased when the optical disk has been recorded by using a different optical disk drive. For a rare occurrence in which an optical disk does not have a good recorded condition, the time required to read out it may be increased significantly. However, the frequency of occurrence of the readout preparation time for the optical disk drives in the multi-disk unit 5 will depict a distribution as shown in FIG. 4 in which the readout preparation time is mostly contained in a range which lies below one-half the maximum readout preparation time $t_1$.

Accordingly, a readout from the magnetic disk storage 4 for the playback request $R_A$ will have been completed at the time when a total of three maximum conveyance times $t_3$ for the playback request $R_A$, $R_B$ and $R_C$, which occur in succession in most cases, or twenty-one sec have passed, as shown in FIG. 3.

Thus, when the maximum conveyance time $t_3$ for the playback request $R_C$ has passed, the optical disk drive 6 which corresponds to the playback request $R_A$ will be transferred into a condition in which it is ready to initiate a readout operation, thus eliminating a waiting time until the conveying operation for the playback request $R_D$ is initiated ($t_2$=0).

The system shown in FIG. 1, which is an example of the first embodiment, can be modified in a manner mentioned below.

For a distribution of the readout preparation time which is different from the distribution shown in FIG. 4, the optical disk drive 6 corresponding to the playback request $R_A$ will have been transferred into a condition which is ready to initiate a readout operation by the termination of the maximum readout preparation time $t_1$ in most cases, provided the distribution has a reduced frequency of occurrence around the maximum readout preparation time $t_1$. Accordingly, a readout command to the magnetic disk storage 4 can be issued in response to the playback request $R_D$ by the time $t_1$ corresponding to the playback request $R_A$ is terminated.

As described above, according to the first embodiment, the completion of the readout preparation time in the optical disk drive 6 is detected to switch to a readout operation from the optical disk drive 6. Accordingly, there is no need to wait for the maximum readout preparation time for the optical disk drives 6 in the multi-disk unit 5 to pass, and in most cases, the readout operation from the optical disk drive 6 can be initiated in a period of time less than the maximum readout preparation time. In this manner, the length of time when data is read from the magnetic disk storage 4 is reduced, yielding an advantage that in the event a number of playback requests which can be simultaneously played back and are determined by the playback capability of the magnetic disk storage 4 exceed the number of channels, a more rapid response is enabled.

In addition, since the switching to a readout operation from the optical disk occurs when the optical disk drive 6 is ready, the occurrence of any unexpected trouble in the automatic disk changing mechanism 15 of the multi-disk unit 5 or a loading mechanism in the optical disk drive 6 to require a repeated conveying operation cannot cause an interruption in the picture signal and/or the audio signal, allowing a continuous playback, provided data which occurs until the optical disk drive 6 is ready to initiate a readout operation is stored in the magnetic disk storage 4.

Second Embodiment

Figure 5:
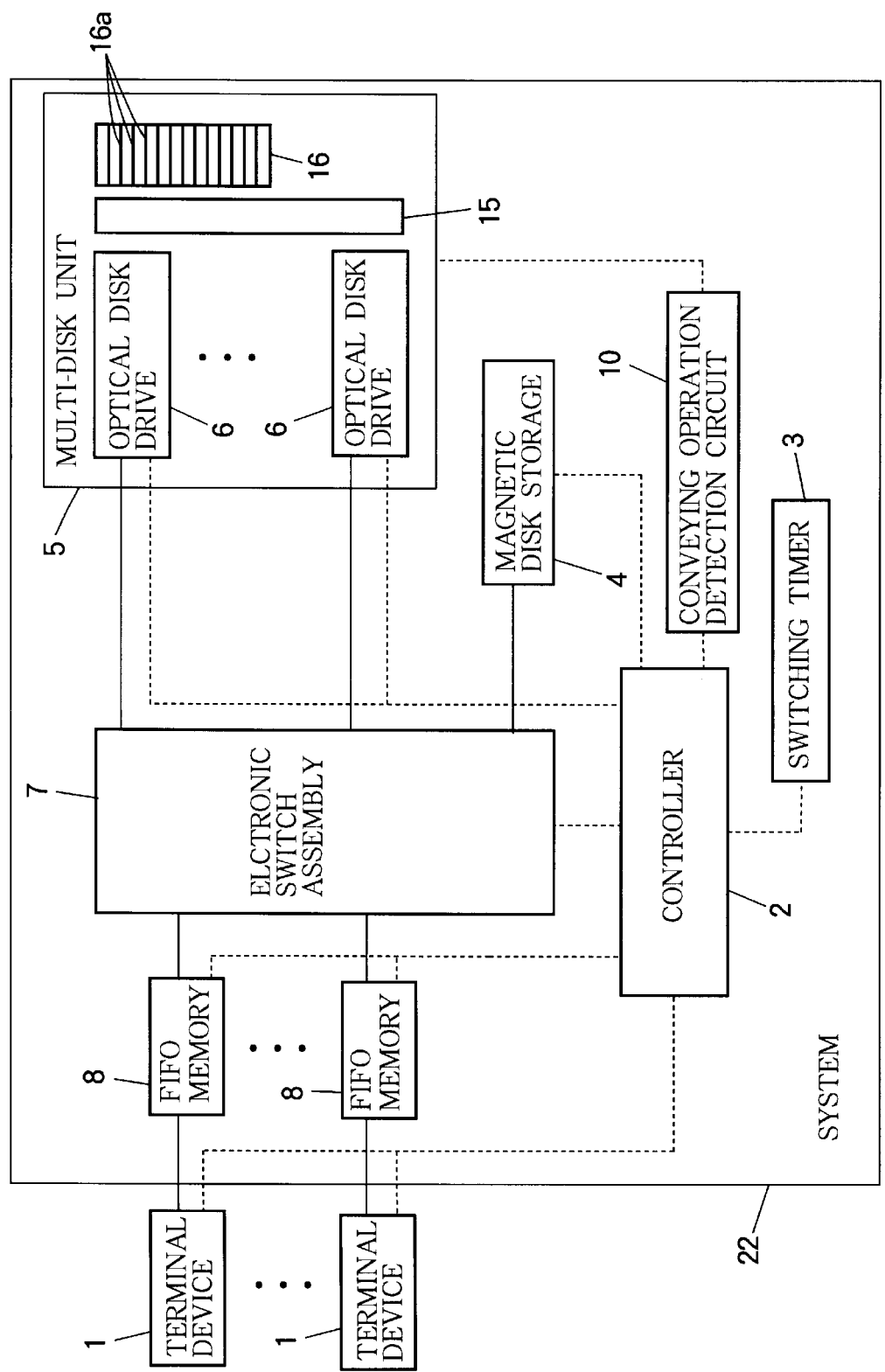
FIG. 5 is a block diagram showing the arrangement of a system for supplying information to terminal devices according to a second embodiment of the present invention.

FIG. 5 is a block diagram showing the arrangement of a system for supplying information to terminal devices according to a second embodiment of the present invention.

The system 22 of the second embodiment shown in FIG. 5 is distinguished from the prior art system shown in FIG. 11 by the provision of a conveying operation detection circuit 10 which detects the completion of the conveying operation of the optical disk by the automatic disk changing mechanism 15 in the multi-disk unit 5 and delivers a detection signal to a controller 2. The conveying operation detection circuit 10 and the multi-disk unit 5 are interconnected by a SCSI, for example.

The operation of the system 22 of the second embodiment will now be described with reference to FIG. 6 which shows the response operation of the system 22 of the second embodiment.

A magnetic disk storage 4 is previously stored with the audio-visual information which are recorded in the beginning portion of the respective information items recorded on the optical disk 16a for a predetermined time $t_1$ equal to thirty sec (which represents a maximum preparation time required for a readout operation by the optical disk drive 6 of the multi-disk unit 5). When a playback request signal, which requires that the audio-visual information be played back, is delivered from terminal devices 1 to the controller 2 ((*a*) in FIG. 6), the controller 2 responds thereto by commanding a magnetic disk storage 4 to read out the beginning portion of the audio-visual information item ((*c*) in FIG. 6), and controls an electronic switch assembly 7 to deliver the audio-visual information read from the magnetic disk storage 4 to the FIFO memory 8 which corresponds to the requesting terminal device 1. The controller 2 also controls the multi-disk unit 5 so that a particular optical disk carrying the requested audio-visual information be mounted on a particular one of optical disk drives 6 contained therein which is determined in accordance with a given rule ((*b*) in FIG. 6) while starting a switching timer 11 to begin counting in order to measure a maximum conveyance time $t_3$ which is preset for the multi-disk unit 5.

Figure 6:
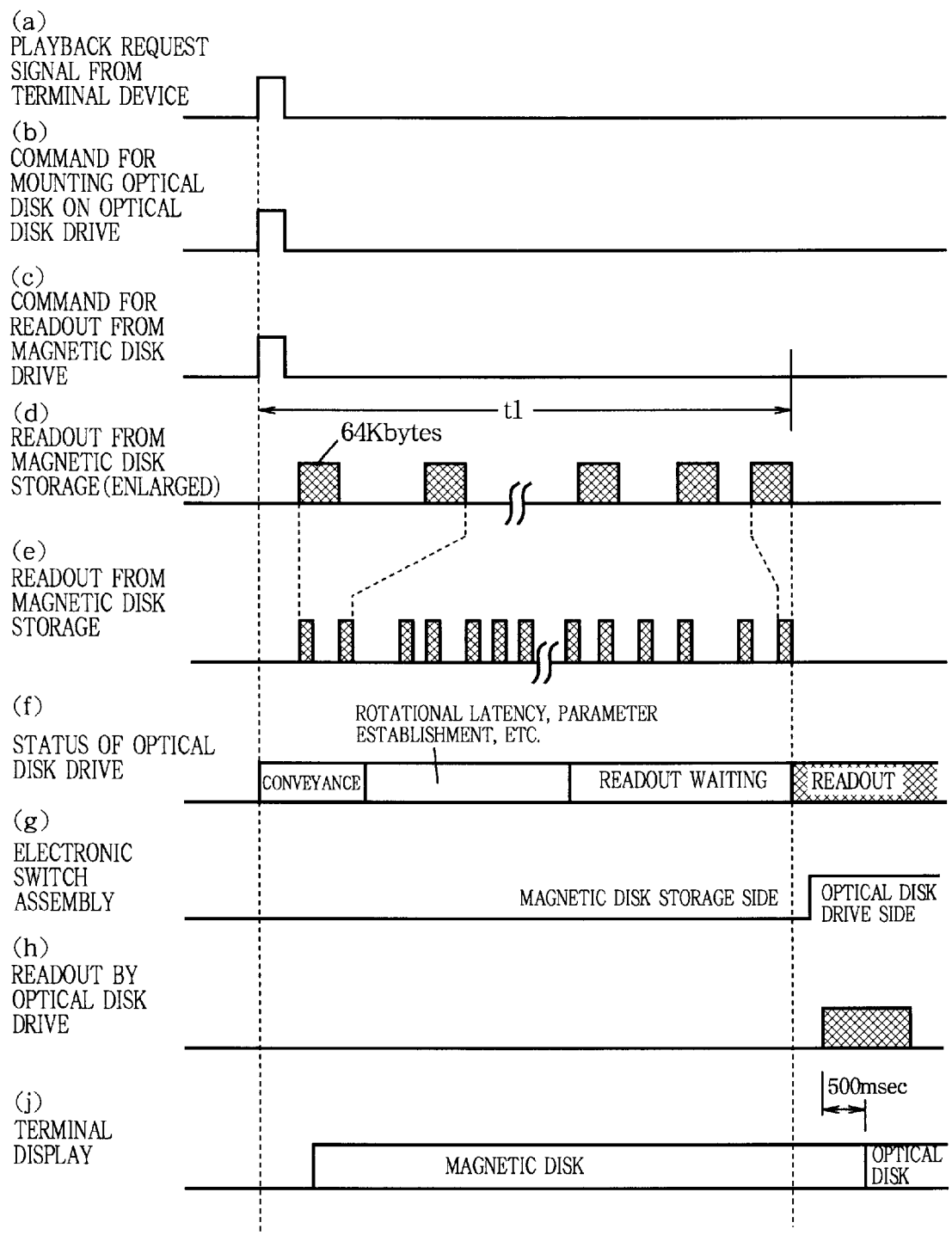
FIG. 6 illustrates the response operation of the system of the second embodiment when a single playback request is issued.

The magnetic disk storage 4 reads out the audio-visual information for an time corresponding to the maximum readout preparation time $t_1$ (equal to thirty sec) of the multi-disk unit 5 in unit of 64 Kbytes, for example, which is then delivered to the FIFO memory 8 through the electronic switch assembly ((*d*) in FIG. 6). The controller 2 controls the readout operation from the magnetic disk storage 4 in a manner to avoid an overflow or an underflow of information in the FIFO memory 8.

The maximum readout preparation time $t_1$ (equal to thirty sec) of the multi-disk unit 5 is determined by the sum of a maximum conveyance time $t_3$ of the multi-disk unit 5, a maximum rotational preparation time of the optical disk drive 6, a maximum seek time, a rotational latency and a time required to determine readout parameters. The audio-visual information is delivered from the FIFO memory 8 to the requesting terminal device 1, where it is decoded and displayed in a period of time on the order of 500 msec ((*e*)–(*i*) in FIG. 6). The above is the response operation of the system 22 in response to a single playback request from the single terminal device 1.

A response operation of the system 22 which occurs when a plurality of terminal devices 1 issue playback requests will be described with reference to FIG. 7 which illustrates the response operation in a plurality of playback operations in the second embodiment.

In the multi-disk unit 5 with the automatic disk changing mechanism 15, requested optical disks are sequentially conveyed to respective associated optical disk drives 6 in the similar manner as in the prior art system. The magnetic disk storage 4 performs a response operation in which it reads out the audio-visual information to corresponding terminal devices 1 in a time sharing scheme ((*c*) in FIG. 7).

Figure 8:
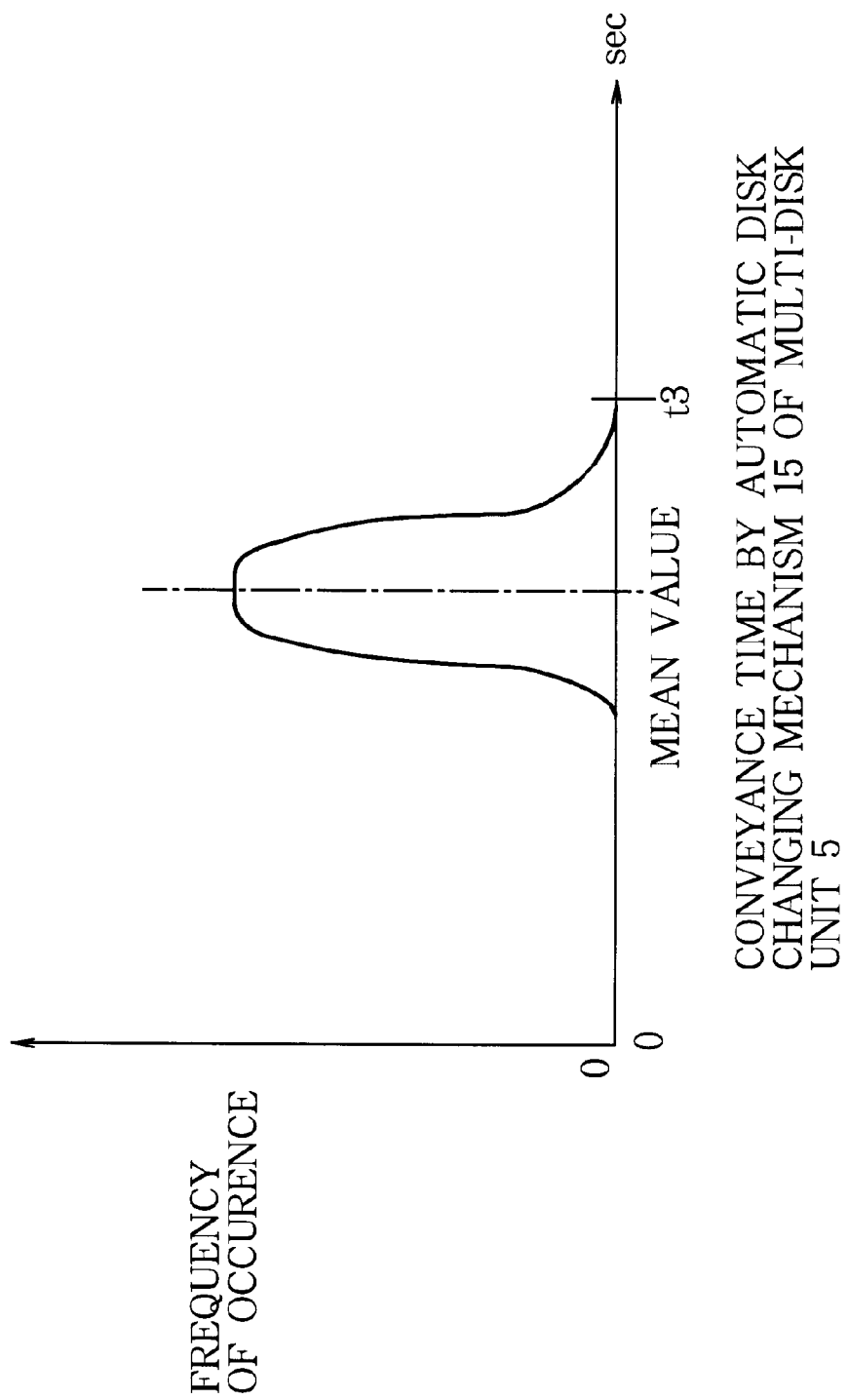
FIG. 8 graphically shows a distribution of the frequency of occurrence of conveyance times in an optical disk drive in a multi-disk unit of the second embodiment.

FIG. 8 graphically shows a distribution of the conveying time of the automatic disk changing mechanism 15 in the multi-disk unit 5. For the distribution illustrated in FIG. 8, a mean value of the disk conveying times is about five sec while a maximum conveying time $t_3$ is seven sec, for example. Accordingly, it is expected with a certain degree of probability that other terminal devices 1 may issue a plurality of playback requests during the time the disk conveying operation required for the initial optical disk drive 6 is being performed.

An instance will be described in which three playback requests are issued by a plurality of terminal devices 1 in the sequence of $R_A$, $R_B$ and $R_C$, each playback request occurring before the completion of the conveying operation of an optical disk corresponding to a preceding playback request to an associated optical disk drive 6.

Figure 7:
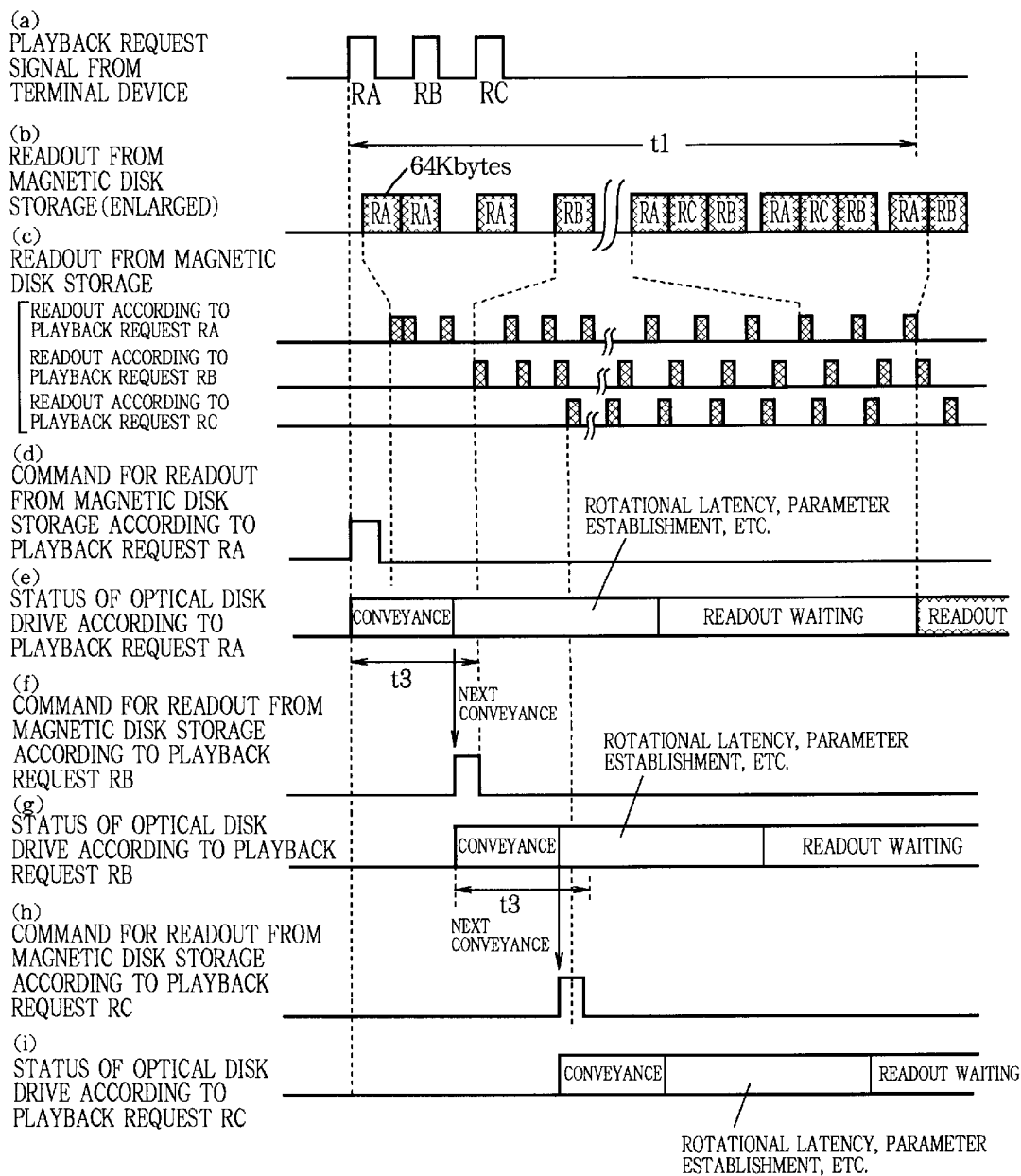
FIG. 7 illustrates the response operation of the system of the second embodiment when a plurality of playback requests are issued.

When the playback request $R_A$, $R_B$ and $R_C$ are sequentially input from the terminal devices 1, As shown at (*a*) in FIG. 7, the controller 2 commands the magnetic disk storage 4 to read out the audio-visual information in response to the initial playback request $R_A$ and also commands through the conveying operation detection circuit 10 to convey a requested optical disk into the multi-disk unit 5 with the automatic disk changing mechanism 15 ((*b*)–(*d*) in FIG. 7).

As mentioned above, the automatic disk changing mechanism 15 in the multi-disk unit 5 operates to convey the requested optical disks sequentially to the associated optical disk drives 6. Thus, when the conveying operation detecting circuit 10 detects the completion of the conveying operation of the optical disk corresponding to the playback request $R_A$ into the its associated optical disk drive 6, it delivers a signal indicating the completion of the conveying operation to the controller 2, which then commands the magnetic disk storage 4 to read out the audio-visual information corresponding to the playback request $R_B$ and also commands a conveyance of the corresponding optical disk ((*c*) and (*f*) in FIG. 7). Subsequently, when the conveying operation detection circuit 10 detects the completion of the conveying operation of the optical disk corresponding to the playback request $R_B$ into its associated optical disk drive 6, it delivers a signal indicating the completion of the conveying operation to the controller 2, which then commands the magnetic disk storage 4 to read out the audio-visual information corresponding to the playback request $R_C$ therefrom and commands the conveyance of the corresponding optical disk ((*c*) and (*h*) in FIG. 7).

In this manner, a readout command in response to the second playback request $R_B$ issues upon detection of the completion of the conveying operation which responds to the playback request $R_A$ if the preset maximum conveyance time $t_3$ has not passed since the initiation of the conveying the optical disk corresponding to the playback request $R_A$, thus initiating the playback of the audio-visual information corresponding to the playback request $R_B$. A similar response also occurs with respect to the next following playback request $R_C$, thus producing a synergetic effect when combined with the response to the playback request $R_B$.

As mentioned above, according to the second embodiment, the readout from the magnetic disk storage 4 and the conveying operation of an optical disk corresponding to the next playback request take place upon detecting the completion of the conveying operation of the optical disk corresponding to the initial playback request into the multi-disk unit 5 with the automatic disk changing mechanism 15. Accordingly, there is no need to wait for the maximum conveyance time which is preset for the multi-disk unit 5 to pass, and in most cases, the readout operation from the magnetic disk storage 4 as well as the conveying operation of the optical disk corresponding to a succeeding playback request are enabled within a reduced period of time than the maximum conveyance time. Accordingly, if a second or more playback requests issue before the completion of the conveying operation of an optical disk corresponding to an initial or preceding playback request to the associated optical disk drive 6, there is obtained an advantage that a more rapid response to a second and a subsequent playback request is enabled. Except for the above-description, the second embodiment is the same the first embodiment.

Third Embodiment

Figure 9:
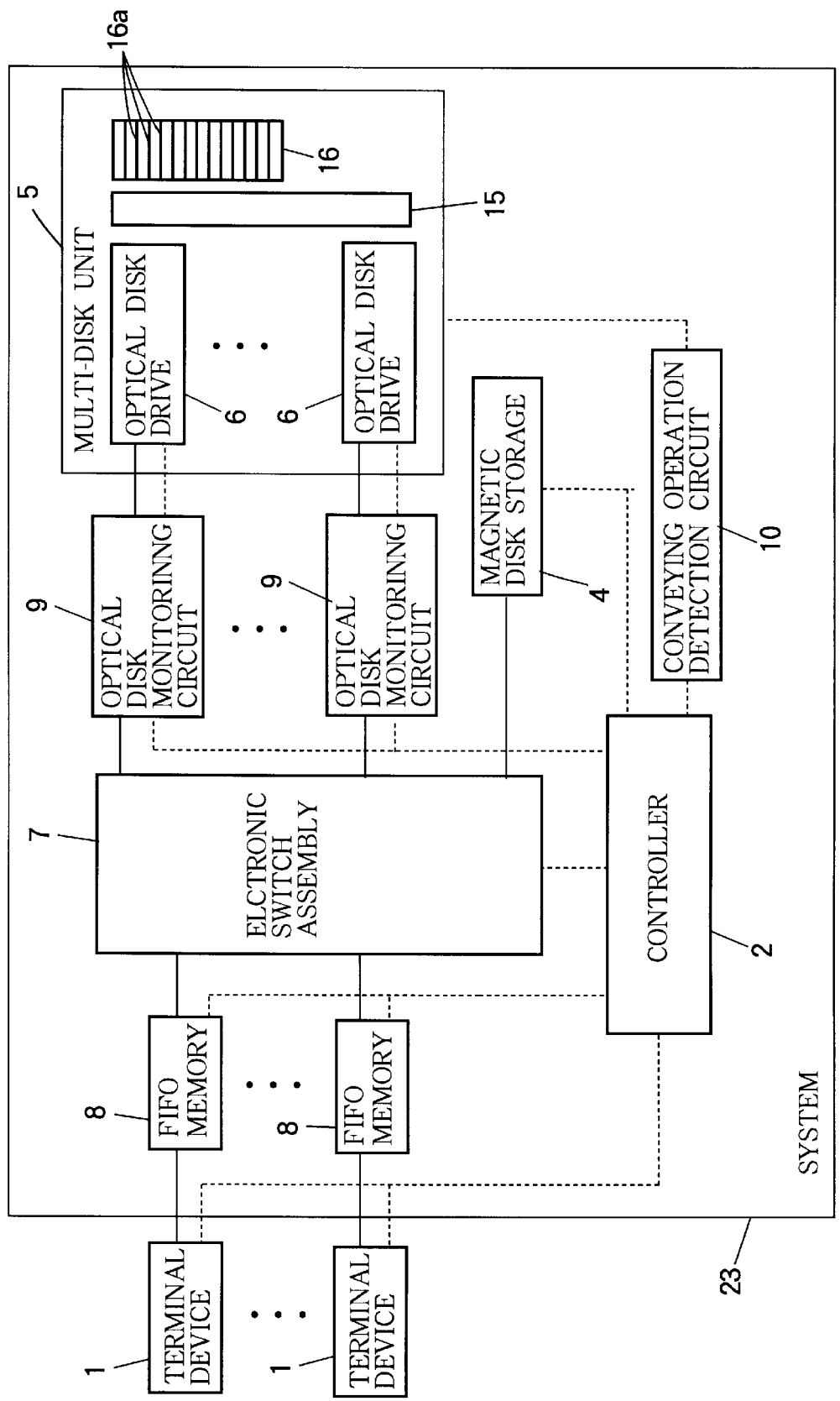
FIG. 9 is a block diagram showing the arrangement of a system for supplying information to terminal devices according to a third embodiment of the present invention.

FIG. 9 is a block diagram showing the arrangement of a system for supplying information to terminal devices according to a third embodiment of the present invention.

The system 23 of FIG. 9 is distinguished from the prior art system shown in FIG. 11 by the provision of an optical disk monitoring circuit 9 which performs a readout operation of the audio-visual information while monitoring a status of an optical disk drive 6 under the control of a controller 2, and a conveying operation detection circuit 10 which detects the completion of the conveying operation of the automatic disk changing mechanism 15 in the multi-disk unit 5 and delivers a detection signal to the controller 2. An interconnection between the optical disk monitoring circuit 9 and the optical disk drive 6 as well as the interconnection between the conveying operation detection circuit 10 and the multi-disk unit 5 is executed by a SCSI, for example.

The operation of the system 23 of the third embodiment will now be described with reference to FIG. 10 which shows the response operation of the system 23 of the third embodiment.

A magnetic disk storage 4 is previously stored with audio-visual information which are stored in the beginning portion of the respective information recorded on the optical disk 16a for a predetermined time $t_1$ equal to thirty sec (which represents a maximum preparation time required for a readout operation by the optical disk drive 6 of the multi-disk unit 5). When one of a plurality of terminal devices 1 issues a playback request signal, demanding audio-visual information, and such playback request signal is delivered to the controller 2, the response operation of the system 23 remains the same as occurs in response to the playback request in the first embodiment (see FIG. 2).

A response operation of the system 23 which occurs when a plurality of terminal devices 1 issue playback requests will be described with reference to FIG. 10 which illustrates the response operation in a plurality of playback operations in the third embodiment.

In the multi-disk unit 5 with the automatic disk changing mechanism 15, requested optical disks are sequentially conveyed to respective associated optical disk drives 6. A response operation by the magnetic disk storage 4 takes place by reading out the audio-visual information to corresponding terminal devices 1 in a time sharing scheme ((c) in FIG. 10). As mentioned above in connection with the second embodiment, the disk conveying time has a mean value of about five sec for the distribution illustrated in FIG. 8, for example, and the maximum conveyance time $t_3$ will be seven sec. Accordingly, it is possible that a plurality of playback requests may issue from other terminal devices 1 during the time the requested optical disk is being conveyed to the associated optical disk drive 6.

Hence, an instance will be described in which four playback requests are issued by a plurality of terminal devices 1 in the sequence of $R_A$, $R_B$, $R_C$ and $R_D$, each playback request being issued before the completion of the conveying operation of an optical disk corresponding to a preceding playback request to its associated optical disk drive 6.

Figure 10:
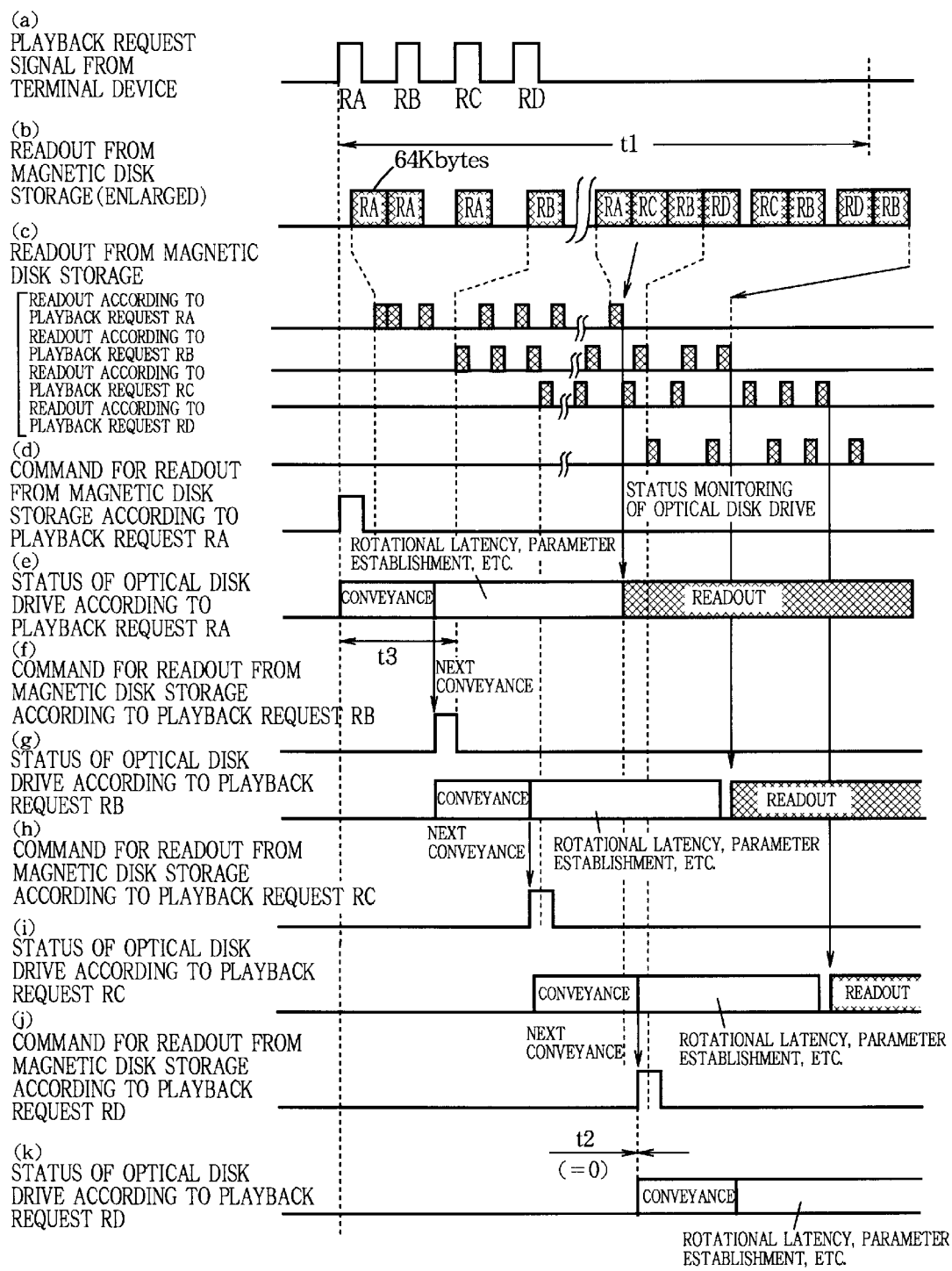
FIG. 10 illustrates the response operation of the system of the third embodiment when a plurality of playback requests are issued.

As shown at (a) in FIG. 10, when playback requests from the terminal devices 1 are input in the sequence of $R_A$, $R_B$, $R_C$ and $R_D$, the controller 2 commands the magnetic disk storage 4 to read out the audio-visual information and also commands the conveying operation detection circuit 10 to cause a conveyance of a requested optical disk into the associated optical disk drive 6 in the multi-disk unit 5 in response to the initial playback request $R_A$ ((b), (c) and (d) in FIG. 10).

There is an upper limit in the data output rate of the magnetic disk storage 4, which may be 20 Mbits/sec, for example, and the magnetic disk storage 4 cannot deliver data at a higher rate. If the respective audio-visual information items are encoded at a rate equal to 6 Mbits/sec, the number of items of the audio-visual information which can be simultaneously delivered from the single magnetic disk storage 4 will be calculated using the following expression:

20 Mbits/sec÷6 Mbits/sec=3.333 to be limited to three.

As mentioned above, the automatic disk changing mechanism 15 in the multi-disk unit 5 operates to convey requested optical disks to the respective optical disk drives 6 in a sequential manner. Specifically, upon detecting the completion of the conveying operation of the optical disk corresponding to the playback request $R_A$ to the optical disk drive 6, the conveying operation detection circuit 10 delivers a signal indicating the completion of the conveying operation to the controller 2, which then commands the magnetic disk storage 4 to read out the audio-visual information corresponding to the playback request $R_B$ and simultaneously commands a corresponding optical disk to be conveyed ((c) and (f) in FIG. 10). Subsequently, upon detecting the completion of the conveying operation of the optical disk corresponding to the playback request $R_B$ to the optical disk drive 6, the conveying operation detection circuit 10 delivers a signal indicating the completion of the conveying operation to the controller 2, which then commands the magnetic disk storage 4 to read out the audio-visual information corresponding to the playback request $R_C$ while simultaneously instructing the conveying operation of the corresponding optical disk ((c) and (h) in FIG. 10).

However, Because of the upper limit in the data output rate from the magnetic disk storage 4, during the time a readout from the magnetic disk storage 4 takes place for the three playback request $R_A$, $R_B$ and $R_C$, the readout of the audio-visual information corresponding to the fourth playback request $R_D$, which exceeds the response capability from the magnetic disk storage 4, is inhibited.

To accommodate for this, the controller 2 interrogates the optical disk monitoring circuit 9 as to the status of the optical disk drive 6 at the time when it has received a signal indicating the completion of the conveying operation for the optical disk which corresponds to the playback request $R_C$ from the conveying operation detection circuit 10. If a result of such interrogation indicates that none of readout preparations for the optical disk drives 6 corresponding to the playback requests $R_A$, $R_B$ and $R_C$ are completed, the readout operation from the magnetic disk storage 4 is continued. However, if the readout preparation of one of the optical disk drives 6 which corresponds to either one of the playback requests $R_A$, $R_B$ and $R_C$ is completed, the controller commands the magnetic disk storage 4 to read out the audio-visual information corresponding to the playback request $R_D$ and simultaneously commands a conveyance of the corresponding optical disk ((c) and (j) in FIG. 10).

A maximum preparation time $t_1$ for a readout operation is determined by the sum of an optical disk conveying time which is defined as a time for conveying the optical disk from the rack 16 to the optical disk drive 6, a rotational preparation time for the optical disk drive 6, a seek time, a rotational latency and a time required to determine readout parameters. The time required to determine the readout parameters exhibits an increased variation as compared with other periods of time such as conveying time, rotational preparation time, seek time or rotational latency because a readout operation is attempted while changing various parameters such as readout laser radiation intensity, an angle of irradiation or the like. Thus, a time required to read out an optical disk may be increased when the optical disk has been recorded by using a different optical disk drive. For a rare occurrence in which an optical disk does not have a good recorded condition, the time required to read out it may be increased significantly. However, the frequency of occurrence of readout preparation times for the optical disk drives in the multi-disk unit 5 will depict a distribution as shown in FIG. 4 in connection with the first embodiment, while the mean value of the disk conveying time is about five sec, as indicated in FIG. 8.

In other words, in most cases, it may be assumed that in the system 23, a readout operation of the audio-visual information from the magnetic disk storage 4 corresponding to the playback request $R_A$ will have been completed at the time when fifteen sec, which is a mean value of the total of three disk conveying times for the playback request $R_A$, $R_B$ and $R_C$ have passed, as indicated in FIG. 10.

Accordingly, the optical disk drive 6 which corresponds to the playback request $R_A$ has already been transferred into the readout operation at the time the conveying operation of the optical disk corresponding to the playback request $R_C$ has been completed, and thus no waiting time is produced until the conveying operation of the optical disk corresponding to the playback request $R_D$ can be initiated ($t_2=0$)

The system 23 shown in FIG. 9 is exemplary of the third embodiment, and can be modified as mentioned below.

For a distribution of readout preparation times which is different from the distribution shown in FIG. 4, as far as the frequency of occurrence around the maximum readout preparation time $t_1$ is low in such distribution, it follows that in almost every case, the optical disk drive 6 which corresponds to the playback request $R_A$ will have been transferred into its readout operation by the termination of the maximum readout preparation time $t_1$. Accordingly, it is possible to provide a readout command to the magnetic disk storage 4 in response to the playback request $R_D$ by the end of the maximum readout preparation time $t_1$ corresponding to the playback request $R_A$.

As described above, according to the third embodiment, the completion of the readout preparation time in the optical disk drive 6 is detected to switch from the readout operation from the magnetic disk storage 4 to the readout operation from the optical disk drive 6. Accordingly, there is no need to wait for the maximum readout preparation time for the optical disk drives 6 in the multi-disk unit 5 to pass, and in most cases, the readout operation from the optical disk drive 6 can be initiated in a period of time less than the maximum readout preparation time. In this manner, the length of time when data is read from the magnetic disk storage 4 is reduced, yielding an advantage that in the event a number of playback requests which can be simultaneously played back and are determined by the playback capability of the magnetic disk storage 4 exceed the number of channels, a more rapid response is enabled.

In addition, the conveying operation and the readout operation from the magnetic disk storage 4 in response to a next playback request occur upon detection of the completion of the conveying operation in the automatic disk changing mechanism 15, avoiding the need to wait for the maximum conveyance time to pass. In almost every case, the conveying operation and the readout operation from the magnetic disk storage 4 take place in a period of time less than the maximum conveyance time, yielding an advantage that a response to a second and a subsequent playback request can be provided more rapidly if a plurality of playback requests issue in a manner that a second or a subsequent playback request occurs before the completion of the conveying operation of the optical disk corresponding to a preceding playback request to the optical disk drive 6.

In addition, since the switching to the readout operation from the optical disk occurs when the optical disk drive 6 is ready, the occurrence of any unexpected trouble in the automatic disk changing mechanism 15 or a loading mechanism in the optical disk drive 6 to require a repeated conveying operation cannot cause an interruption in the picture signal and the audio signal, allowing a continuous playback, provided data which occurs until the optical disk drive 6 is ready to initiate a readout operation is stored in the magnetic disk storage 4. Except for the above-description, the third embodiment is the same as any of the first and second embodiments.

In the first to third embodiments described above, it has been mentioned that the command to read out the magnetic disk storage 4 and the command to convey the optical disk occur in response to a playback request concurrently. However, these commands need not be concurrent. For example, the command may initiate a readout operation from the magnetic disk storage 4 with a time delay of around one sec, with substantially similar effect. Conversely, the magnetic disk storage 4 may store an amount of data which is in excess of the amount of data for the maximum readout preparation time. In this instance, the readout command to the magnetic disk storage 4 may be issued earlier by a length of the period of time which is in excess of the maximum readout preparation time, thus allowing a more rapid response.

Fourth Embodiment

Figure 13:
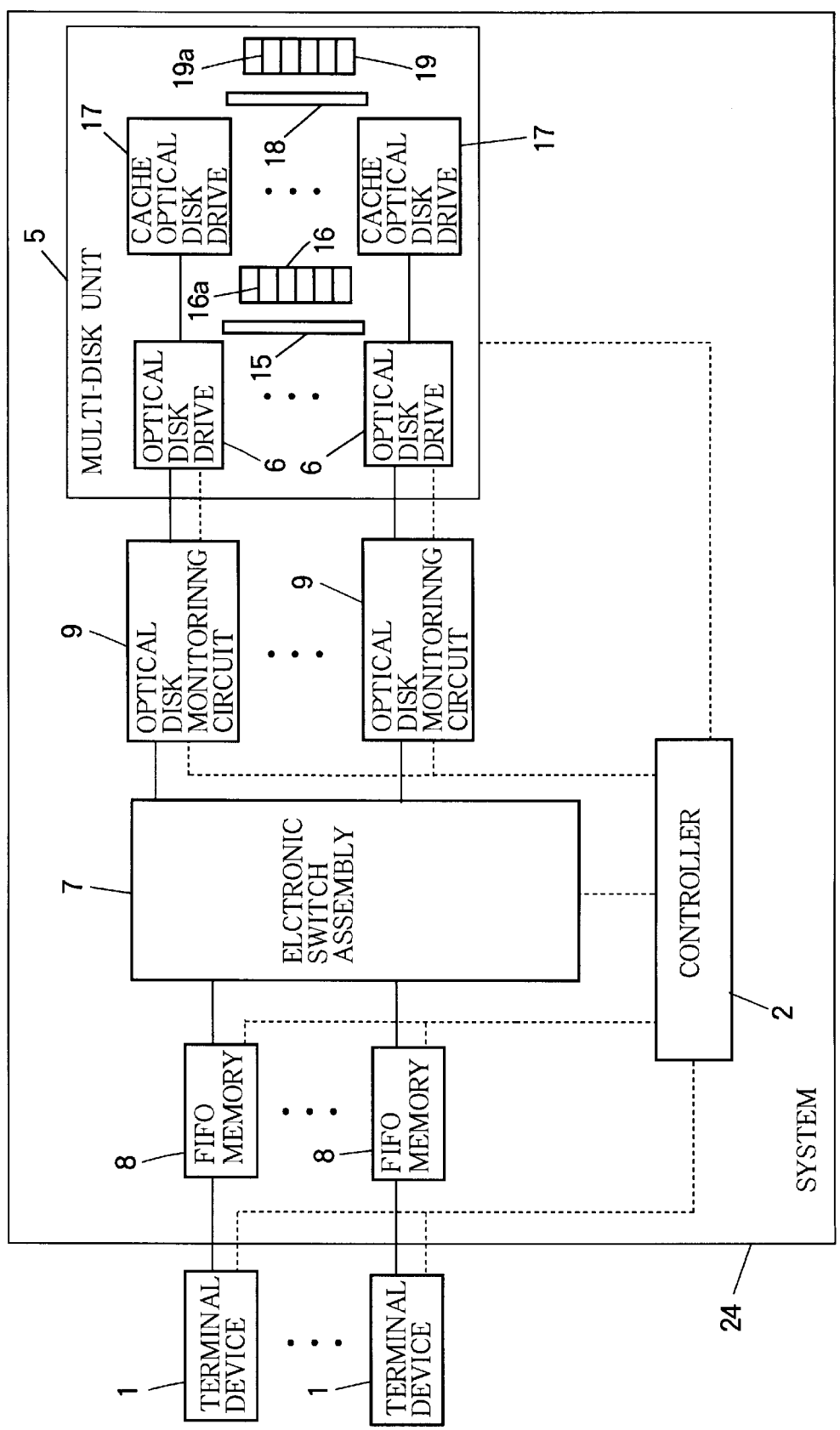
FIG. 13 is a block diagram showing the arrangement of a system for supplying information to terminal devices according to a fourth embodiment.

FIG. 13 is a block diagram showing the arrangement of a system for supplying information to terminal devices according to a fourth embodiment of the present invention.

Referring to FIG. 13, the system 24 for supplying information to terminal devices 1 has a multi-disk unit 5 which includes one or more optical disk drives 6 such as a magneto-optical disk drive and the like, a rack 16 being capable of accommodating a plurality of optical disks 16a such as magneto-optical disks and the like, and automatic disk changing mechanism 15 for conveying a disk 16a between the rack 16 and the optical disk drives 6. The multi-disk unit 5 also includes one or more cache optical disk drives 17, a rack 19 being capable of accommodating a plurality of cache optical disks 19a, and an automatic disk changing mechanism 18 for conveying a cache optical disk 19a between the rack 19 and the optical disk drives 17. The term "cache optical disk" means a record medium such as a magneto-optical disk which stores information regarding a beginning portion (e.g., thirty sec) of the audio-visual information recorded on the disk 16a. The each cache optical disk drive 6 is capable of mounting a recordable optical disk 19a such as a magneto-optical disk and playing back an information such as a music number or a video program recorded on the mounted disk 19a to output reproduced information such as audio-visual information.

The cache optical disk drives 17 stores information regarding a beginning portion of the each information item recorded on the disk or disks 16a to be reproduced. A length of the beginning portion is set to be equal to or longer than a length corresponding to a readout preparation time which is defined as a time from a playback request input to completion of readout preparation of the optical disk drive 6 which mounts the disk 16a to be reproduced. The cache optical disk drives 17 are capable of beginning to output the stored information with a readout preparation time shorter than the readout preparation time of the optical disk drive 6.

The system 24 further has optical disk monitoring circuits 9 each monitoring status of the optical disk drive 6 and outputting a signal indicating the status of the optical disk drive 6, an electronic switch assembly 7 for selectively outputting one of the stored information from the magnetic disk storage 4 and the reproduced information from the optical disk drives 6, and FIFO memories 8 for temporarily holding and outputting information from the electronic switch assembly 7.

The system 24 has a controller 2 which performs a control operation for causing the electronic switch assembly 7 to output the stored information from the cache optical disk drive 17 in response to the playback request input from the terminal device 1, and subsequently causing the electronic switch assembly 7 to output the reproduced information from the optical disk drive 6 in response to the signal from the optical disk monitoring circuit 9 so that the FIFO memory 9 outputs to the terminal device 1 continuous information which includes the stored information from the cache optical disk drive 17 reproduced information from the optical disk drive 6 following the stored information from the magnetic disk storage 4.

As described above, the system 24 of FIG. 13 is distinguished from the prior art system shown in FIG. 11 by the provision of a plurality of cache optical disk drives 10, each corresponding to an optical disk drive 6 in a multi-disk unit 5, and a plurality of optical disk monitoring circuits 9, each being operative to read the audio-visual information while monitoring the status of the associated optical disk drive 6 under the control of a controller 2. The interconnection between the optical disk monitoring circuit 9 on one hand and the optical disk drive 6 and the cache optical disk drive 17 on the other hand is executed by way of a SCSI, for example.

The operation of the system 24 of the fourth embodiment will now be described.

The cache optical disks stores audio-visual information which is the same as the audio-visual information recorded in a beginning portion of each audio-visual information item (e.g. a music number or a video program) recorded on the associated optical disk for a maximum readout preparation time $t_1$ (which may be equal to thirty sec, for example) of the multi-disk unit 5. The number of such optical disks 19a, serving as cache optical disks, is equal to the number of cache optical disk drives 17, in this embodiment. After turning on the power of the system 24, the controller 2 controls the multi-disk unit 5 to load individual cache optical disks 19a into respective associated cache optical disk drives 17. The controller 2 does not accept a playback request from any terminal device 1 until a readout operation from the cache optical disk drive 17 is enabled.

When a readout operation from the cache optical disk drive 17 is enabled, the system 24 begins the following operation.

Initially, the controller 2 accepts a playback request from each terminal device 1. When one of the plurality of terminal devices 1 issues and delivers a playback request signal, demanding a specific audio-visual information, to the controller 2, the controller 2 responds thereto by commanding a corresponding cache optical disk drive 17 to read out the audio-visual information having a requested title while controlling an electronic switch assembly 7 such that the audio-visual information read from the selected cache optical disk drive 17 may be delivered to a FIFO memory 8 corresponding to the requesting terminal device 1. The controller 2 also controls the multi-disk unit 5 so that an optical disk containing the audio-visual information of the requested title be loaded on a selected one of the optical disk drives 6 which is determined in accordance with a given rule.

The audio-visual information which is read from the cache optical disk drive 17 is delivered to the associated FIFO memory 8 through the electronic switch assembly 7. At this time, the controller 2 controls the readout operation of the cache optical disk drive 17 in a manner to avoid an overflow or an underflow of information in the FIFO memory 8. Concurrently with the described control operations, the multi-disk unit 5 executes a loading of an optical disk which stores the requested audio-visual information (title) onto a selected optical disk drive 6. An optical disk monitoring circuit 9 detects and maintains a signal indicating the completion of a readout preparation of the selected optical disk drive 6. The optical disk monitoring circuit 9 assumes a readout preparation condition until the signal indicating the completion of a readout preparation of the optical disk drive 6 is detected.

A readout of audio-visual information from the cache optical disk drive 17 is performed in unit of 64 Kbytes, for example, by causing the controller 2 to control the electronic switch assembly 2, to be delivered to the given FIFO memory 8. Each time the readout of audio-visual information in unit of 64 Kbytes is completed, the controller 2 interrogates the optical disk monitoring circuit 9 as to the status of the optical disk drive 6. If a result of interrogation indicates that the readout preparation of the optical disk drive 6 is not yet completed, the readout from the cache optical disk drive 17 is continued. However, if the readout preparation of the optical disk drive 6 is completed, the next readout of the audio-visual information in unit of 64 Kbytes does not take place from the cache optical disk drive 17, but is switched to the readout of audio-visual information from the optical disk drive 6 by controlling the electronic switch assembly 7.

The position where the readout from the optical disk is initiated is selected to read data which immediately follows the data that has been read from the cache optical disk drive 17. Such position can be determined by calculation on the basis of the number of times 64 Kbytes data is read from the cache optical disk drive 17, within a period of time of 10 msec, for example. In this manner, when accessing the optical disk drive 6, the readout of the audio-visual information can be initiated after a period of time of 50 msec, for example.

There is an empty time corresponding to a period of time of 60 msec in the data transfer from the optical disk. To accommodate for this, the FIFO memory 8 may have a capacity of 256 Kbytes and may be controlled so that a quantity of audio-visual information always fill one-half the capacity (i.e., 128 Kbytes) or more of the memory 8. When an encoding rate of 6 Mbits/sec is used, 45 Kbytes data will be read out from the FIFO memory 8 during a period of time corresponding to the empty time in the data transfer, as indicated by an equation given below, but there still remains data equal to or greater than 83 Kbytes in the FIFO memory 8, thus avoiding an interruption in the data stream.

$$6000 \text{ Kbits} \times 0.06 \text{ sec} \div 8 \text{ bits} = 45 \text{ Kbytes}$$

The audio-visual information is delivered from the FIFO memory 8 to the requesting terminal device 1 where it is decoded and displayed in a period of time on the order of 500 msec.

What has been described above is a response operation of the system 24 to the playback request from one of the plurality of terminal devices 1, which is first received by the controller 2. When a next playback request reaches the controller 2, the controller 2 controls the cache optical disk drive 17 and the optical disk drive 6 which are different from those mentioned above in the similar manner as before, and upon detecting the completion of the readout preparation of the optical disk drive 6, the data transfer is switched from the audio-visual information supplied from the cache optical disk drive 17 to data which is read from the optical disk drive 6.

Thus in accordance with the fourth embodiment, a given audio-visual information is supplied from the cache optical disk drive 17 to the requesting terminal device 1 until a readout preparation of the optical disk drive 6 is completed, and upon detecting the completion of the readout preparation, the data transfer is switched to data which is read from the optical disk drive 6. Accordingly, if a plurality of playback requests occur during the maximum readout preparation time of the optical disk drive 6, a rapid response can be provided advantageously to respective requests from the terminal devices 1. Except for the above-description, the fourth embodiment is the same as any of the first to third embodiments.

Fifth Embodiment

Figure 14:
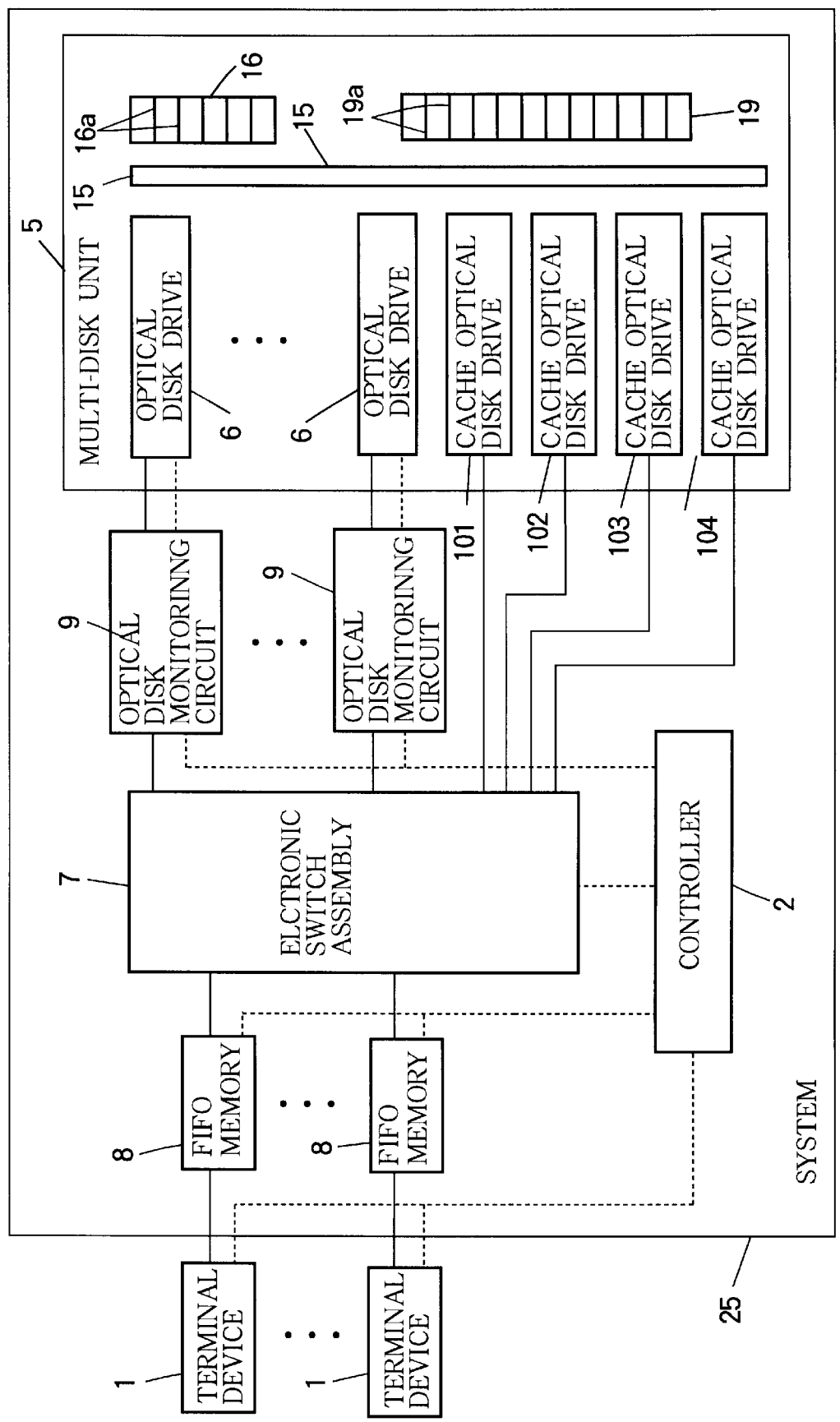
FIG. 14 is a block diagram showing the arrangement of a system for supplying information to terminal devices according to a fifth embodiment of the present invention.

FIG. 14 is a block diagram showing the arrangement of a system for supplying information to terminal devices according to a fifth embodiment of the present invention.

The system 25 of the fifth embodiment is distinguished from the fourth embodiment shown in FIG. 13 in that a multi-disk unit 5 of the fifth embodiment is provided with only a limited number of cache optical disk drives 10, which is less that the number of optical disk drives 6 and is equal to four in the fifth embodiment. In this manner, a controller 2 is enabled to keep the titles of the audio-visual information stored by optical disks 16a which are to be loaded on respective cache optical disk drives 101–104. Thus, the controller 2 can select either one of the cache optical disk drives 17 according to the title which is subject to a playback request from a terminal device 1 until one of a plurality of optical disk drives 6 is selected by an electronic switch assembly 7 to be connected with a corresponding terminal device 1. In the event a plurality of playback requests occur within the maximum readout preparation time of the optical disk drive 6, a rapid response can be provided to enable a playback of a given audio-visual information, in the similar manner as in the fourth embodiment. Except for the above-description, the fifth embodiment is the same as any of the first to fourth embodiments.

In both fourth and fifth embodiments, the optical disk drives 6 and the cache optical disk drives 10 belong to a common multi-disk unit 5, thus simplifying the arrangement of the system 25. However, the optical disk drives 6 and the cache optical disk drives 10 may each constitute an independent unit.

It has been mentioned above that audio-visual information from the cache optical disk drives 17 are read out in unit of 64 Kbytes, but it should be understood that the unit is not limited to 64 Kbytes, but a control may be exercised so that the readout operation may be controlled in unit of a single byte. While it has been mentioned above that the status of the optical disk drive 6 is interrogated at the end of a readout operation for 64 Kbytes, the interrogation is not limited to the end of the readout operation, and need not be performed at the end of every readout operation.

It has been mentioned above that audio-visual information is read out from the magnetic disk storage 4 or the cache optical disk drives in unit of 64 Kbytes, but the unit is not limited to 64 Kbytes, and instead the readout operation may be controlled in unit of a single byte.

It has also been mentioned that the status of the optical disk drive 6 is interrogated upon completion of reading out 64 Kbytes, but it is unnecessary to make an interrogation at the end of each readout operation.

In addition, it has also been mentioned that a signal indicating the completion of a readout preparation from the optical disk drive 6 is received and is maintained by the optical disk monitoring circuit 9. However, alternatively, a control may be exercised in a manner such that the status of the optical disk drive 6 is confirmed at the commencement of the readout operation and the status of the optical disk drive 6 may be read out only when a readout preparation has been completed.

In the above-described embodiments, the system comprises a single multi-disk unit 5 with the automatic disk changing mechanism 15 including a plurality of optical disk drives 6, but the system may comprise a plurality of similar multi-disk units 5 as well.

It has also been mentioned that the magnetic disk storage 4 or the cache optical disk drives serving as a storage means stores a quantity of audio-visual information corresponding to the beginning portion of the respective information items (corresponding to a maximum readout preparation time $t_1$ of the multi-disk unit 5). However, such stored information is not limited to the beginning portion of each audio-visual information item (including a requested title), but the audio-visual information belonging to one item (e.g., a music number or a video program) may be divided into a plurality of audio-visual information segments, and the magnetic disk storage 4 may store a quantity of audio-visual information corresponding to the time $t_1$ contained in the beginning portion of each divided audio-visual information segment.

Finally, the playback means is not limited to an optical disk drive 6, but it may be a device which can supply a large quantity of information. Further, the storage means is not limited to a magnetic disk storage 4, but it may be a device which is capable of a more rapid readout operation than the playback means.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A system for supplying information to a terminal device comprising:

playback means for mounting a record medium and reading information recorded on the record medium to output a first information;

storage means for storing information regarding a beginning portion of the information recorded on the record medium, a length of the beginning portion being equal to or longer than a length corresponding to a first preparation time which is defined as a time from a playback request input to completion of readout preparation of said playback means, said storage means being capable of beginning to output a second information corresponding to the stored information with a second preparation time shorter than the first preparation time;

monitoring means for monitoring status of said playback means and outputting a signal indicating the status;

switching means for selectively outputting one of the second information from said storage means and the first information from said playback means;

buffer means for temporarily holding and outputting information from said switching means; and control means for performing a control operation wherein the second information is first output from said storage means through said switching means in response to the playback request input from the terminal device, and subsequently the first information is output from said playback means through said switching means in response to the signal from said monitoring means so that said buffer means outputs continuous information which includes the second information and the first information following the second information to the terminal device.

2. The system of claim 1 further comprising:

a rack being capable of accommodating a plurality of record media; and medium changing means for conveying any of the plurality of record media in said rack to said playback means in response to the playback request from the terminal device.

3. The system of claim 1, wherein said playback means include a magneto-optical disk drive which mounts a record medium and optically read information recorded on the record medium to output the first information.

4. The system of claim 1, wherein said storage means includes a magnetic disk storage which magnetically records information on a magnetic disk and reads the recorded information to output the second information.

5. The system of claim 1, wherein said storage means includes a magneto-optical disk drive which mounts a magneto-optical disk, which stores information regarding a beginning portion of the information recorded on the record medium, and optically records information on the magneto-optical disk and reads the recorded information from the magneto-optical disk to output the second information.

6. The system of claim 1, wherein said monitoring means outputs the signal indicating the status when the readout preparation of said playback means for the record medium designated by the terminal device has been completed.

7. The system of claim 2, wherein said monitoring means outputs the signal indicating the status when the record medium designated by the terminal device has been conveyed to said playback means.

8. The system of claim 1, wherein:

when a plurality of playback requests are input to said control means from a plurality of terminal device, said control means first begins the control operation for a record medium to be reproduced early; and when the readout preparation of the playback means for the record medium to be reproduced early is completed, said control means begins the control operation for a record medium to be reproduced next.

9. The system of claim 2, wherein:

when a plurality of playback requests are input to said control means from a plurality of terminal device, said control means first begins the control operation for a record medium to be reproduced early; and when the record medium to be reproduced early has been conveyed to said playback means by said medium changing means, said control means begins the control operation for a record medium to be reproduced next.

* * * * *